United States Patent
Preda et al.

(10) Patent No.: US 11,818,100 B2
(45) Date of Patent: Nov. 14, 2023

(54) AUTOMATIC PROVISIONING OF STREAMING POLICIES FOR VIDEO STREAMING CONTROL IN CDN

(71) Applicant: Telefonaktiebolaget LM Ericsson (publ), Stockholm (SE)

(72) Inventors: Stere Preda, Longueuil (CA); Daniel Migault, Montreal (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 133 days.

(21) Appl. No.: 16/769,672

(22) PCT Filed: Dec. 4, 2017

(86) PCT No.: PCT/IB2017/057618
§ 371 (c)(1),
(2) Date: Jun. 4, 2020

(87) PCT Pub. No.: WO2019/111033
PCT Pub. Date: Jun. 13, 2019

(65) Prior Publication Data
US 2021/0288942 A1  Sep. 16, 2021

(51) Int. Cl.
*H04L 9/40* (2022.01)
(52) U.S. Cl.
CPC .............................. *H04L 63/0263* (2013.01)
(58) Field of Classification Search
CPC . H04L 63/02; H04L 63/0263; H04L 65/4084; H04L 65/607; H04L 63/0254
See application file for complete search history.

(56) References Cited

U.S. PATENT DOCUMENTS 7,137,004 B2  11/2006  England et al.
8,099,774 B2  1/2012  Abzarian et al.
(Continued)

OTHER PUBLICATIONS

R. Huysegems, B. De Vleeschauwer, T. Wu and W. van Leekwijck, "SVC-based HTTP adaptive streaming," in Bell Labs Technical Journal, vol. 16, No. 4, pp. 25-41, Mar. 2012, doi: 10.1002/bltj.20532. (Year: 2012).*

(Continued)

*Primary Examiner* — Jung W Kim
*Assistant Examiner* — Sameera Wickramasuriya
(74) *Attorney, Agent, or Firm* — Withrow & Terranova, PLLC

(57) ABSTRACT

Methods and systems for automatic provisioning of security policies for content streaming control within a Content Delivery Network (CDN) are provided. According to one aspect, a method for automatic provisioning of security policies for content streaming control by a network node within a CDN that supports at least one streaming media protocol comprises: obtaining a manifest, the manifest being generated in response to a user requesting a streaming content from the CDN; determining a first security policy associated with the user and/or the requested streaming content in accordance with the manifest; updating a set of firewall rules for implementing security policies in accordance with the determined first security policy; and applying the updated set of firewall rules to validate requests from the user for the streaming content. The policies are dynamically configured and may be sparsely provisioned, e.g., downloaded only to the pertinent nodes and activated only when necessary.

38 Claims, 12 Drawing Sheets

(56) References Cited

U.S. PATENT DOCUMENTS

| | | | |
|---|---|---|---|
| 9,270,724 B1* | 2/2016 | Morgan | H04L 65/4084 |
| 9,621,933 B2* | 4/2017 | Phillips | H04N 21/2402 |
| 9,705,909 B2* | 7/2017 | Zaw | H04L 63/0263 |
| 9,762,604 B2 | 9/2017 | Zaw | |
| 9,787,599 B2* | 10/2017 | Richardson | H04L 47/70 |
| 10,148,713 B2* | 12/2018 | Liu | H04L 65/80 |
| 10,225,620 B1* | 3/2019 | Phillips | H04N 21/64792 |
| 10,270,878 B1* | 4/2019 | Uppal | H04L 67/42 |
| 10,506,029 B2* | 12/2019 | Hollis | H04L 67/2842 |
| 2008/0289026 A1* | 11/2008 | Abzarian | G06F 21/57 726/11 |
| 2012/0090036 A1* | 4/2012 | Kang | H04N 21/23439 726/27 |
| 2013/0185759 A1* | 7/2013 | Huysegems | H04L 65/80 725/116 |
| 2013/0297743 A1* | 11/2013 | Eschet | H04L 65/60 709/219 |
| 2014/0137181 A1* | 5/2014 | Christodorescu | G06F 21/60 726/1 |
| 2014/0189150 A1* | 7/2014 | De Vleeschauwer | H04L 65/4069 709/231 |
| 2014/0304359 A1* | 10/2014 | Corbett | G06F 3/0614 709/213 |
| 2014/0344452 A1* | 11/2014 | Lipstone | H04L 41/50 709/224 |
| 2014/0359749 A1* | 12/2014 | Rieke | G06F 9/45558 726/11 |
| 2015/0052236 A1 | 2/2015 | Friedrich et al. | |
| 2015/0201042 A1* | 7/2015 | Shah | H04L 65/4084 709/219 |
| 2015/0207846 A1* | 7/2015 | Famaey | H04L 65/4084 709/219 |
| 2016/0182454 A1* | 6/2016 | Phonsa | H04L 63/1433 726/11 |
| 2016/0182466 A1* | 6/2016 | Wagenaar | H04L 63/0876 713/154 |
| 2017/0034170 A1* | 2/2017 | Huang | H04L 65/612 |
| 2017/0034199 A1* | 2/2017 | Zaw | H04L 63/1433 |
| 2017/0187768 A1* | 6/2017 | Huang | H04L 67/2842 |
| 2017/0250951 A1* | 8/2017 | Wang | H04L 41/0869 |
| 2017/0272485 A1* | 9/2017 | Gordon | H04L 65/601 |
| 2019/0036880 A1* | 1/2019 | Dasar | G06F 11/3006 |
| 2020/0077161 A1* | 3/2020 | Lohmar | H04L 65/602 |

OTHER PUBLICATIONS

S. T. Ali, V. Sivaraman, A. Radford and S. Jha, "A Survey of Securing Networks Using Software Defined Networking," in IEEE Transactions on Reliability, vol. 64, No. 3, pp. 1086-1097, Sep. 2015, doi: 10.1109/TR.2015.2421391. (Year: 2015).*

Author Unknown, "ABR Session-Based Encryption and Session Tracking," Cisco Internet Streamer CDS 3.1 Software Configuration Guide, Appendix G, Last updated: Jun. 11, 2014, URL: "https://www.cisco.com/c/en/us/td/docs/video/cds/cda/is/3_1/configuration_guide/icds31confg/ABRsessionEncryption.pdf", retrieved Jun. 1, 2020, 20 pages.

Author Unknown, "[MS-SSTR]: Smooth Streaming Protocol," [MS-SSTR]—v20160714, Microsoft Corporation, Jul. 14, 2016, 64 pages.

Author Unknown, "Understanding Dynamic Firewall Filters," Juniper Networks, TechLibrary, published Aug. 30, 2017, URL: "https://www.juniper.net/documentation/en_US/junos/topics/concept/subscriber-management-dynamic-firewall-filter-overview.html#", retrieved Jun. 1, 2020, 2 pages.

Schonning, Nick, et al., "IIS Smooth Streaming Client Manifest—SmoothStreamingMedia Element," Microsoft Corp., May 2, 2012, URL: "https://docs.microsoft.com/en-us/iis/extensions/smooth-streaming-manifest-structure/iis-smooth-streaming-client-manifest-smoothstreamingmedia-element?redirectedfrom=MSDN", retrieved Jun. 1, 2020, 7 pages.

International Search Report and Written Opinion for International Patent Application No. PCT/IB2017/057618, dated Jun. 21, 2018, 14 pages.

Examination Report for Indian Patent Application No. 202047027762, dated Nov. 9, 2021, 5 pages.

* cited by examiner

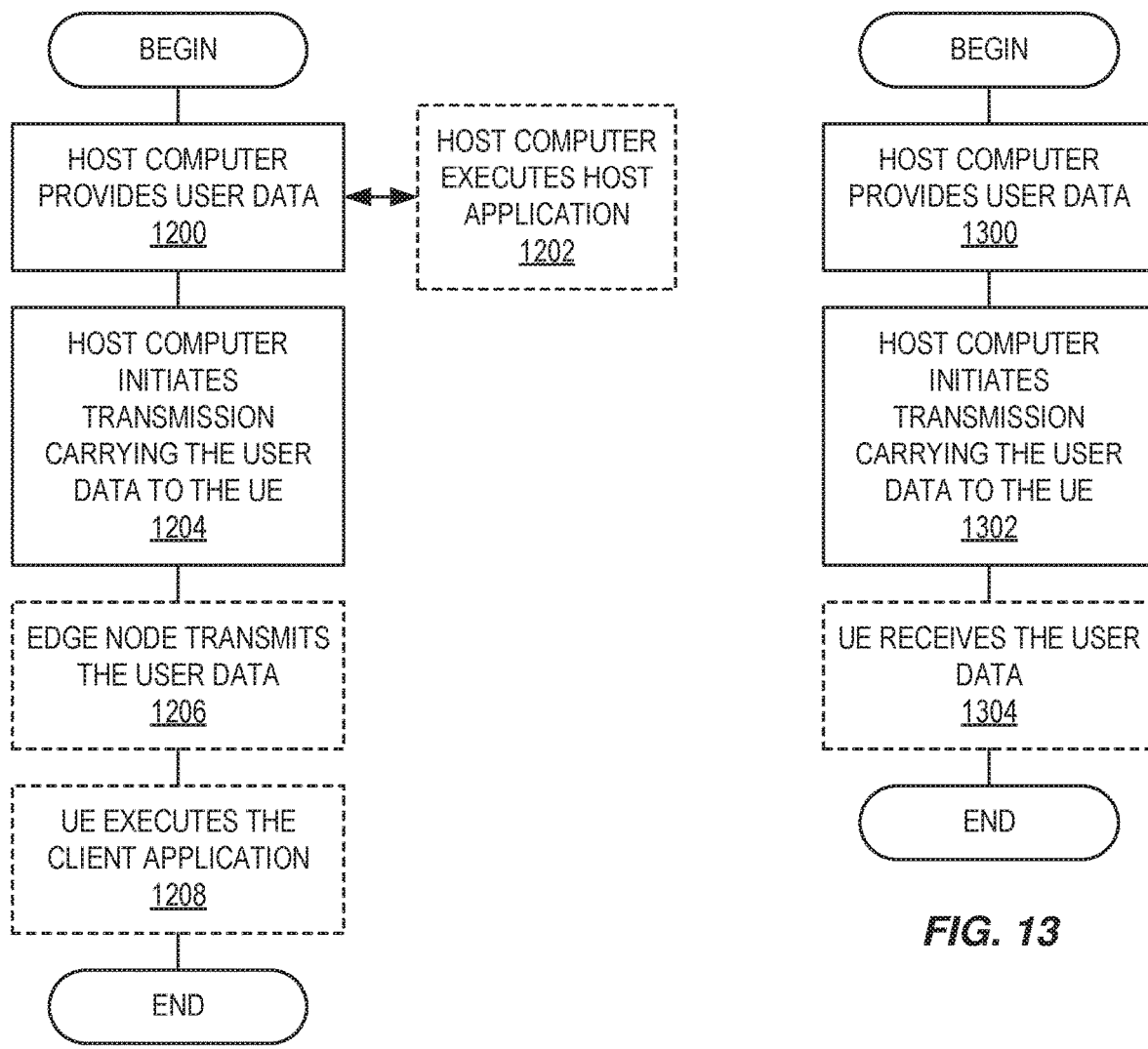

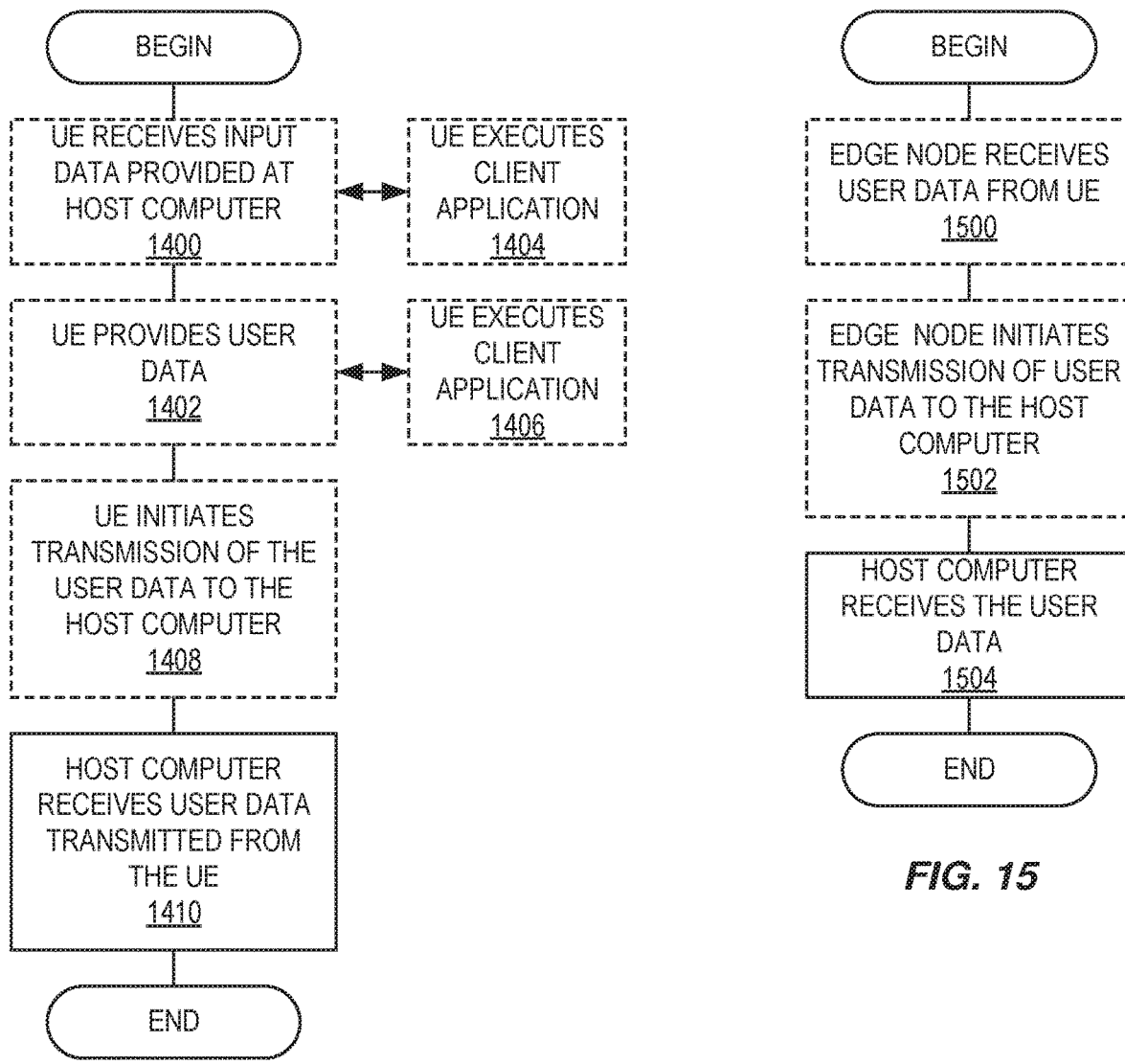

AUTOMATIC PROVISIONING OF STREAMING POLICIES FOR VIDEO STREAMING CONTROL IN CDN

This application is a 35 U.S.C. § 371 national phase filing of International Application No. PCT/IB2017/057618, filed Dec. 4, 2017, the disclosure of which is incorporated herein by reference in its entirety.

TECHNICAL FIELD

The present disclosure relates to Content Delivery Networks (CDNs) and more particularly to automatic provisioning of streaming policies for video streaming control in a CDN.

BACKGROUND

FIG. 1 illustrates a simplified example of an interaction between a User Equipment (UE) and a Content Delivery Network (CDN). A CDN may also be referred to herein as an Internet Service Provider CDN (ISP-CDN). The interaction will be described within the context of a Hypertext Transfer Protocol (HTTP) Smooth Streaming (HSS) session, but the same concepts apply to other streaming technologies, such as Dynamic Adaptive Streaming over HTTP (DASH), HTTP Live Streaming (HLS), and the like. The UE and CDN illustrated in FIG. 1 operate in a client/server relationship, with the UE as the client and the CDN as the server.

In FIG. 1, the UE requests the manifest for particular content (message 100) and receives the manifest from the CDN (message 102). The manifest lists fragments, which represent downloadable units of media and which are identified with Uniform Resource Identifiers (URIs) based on a media Uniform Resource Locator (URL) pattern from the manifest file. The UE processes the manifest file (action 104), e.g., parsing the file and storing it with the UE.

The UE can then begin making requests for content fragments, usually starting with a request for the first fragment, e.g., fragment #1 (message 106). In HSS, these requests will include a URI that identifies the content being requested and that includes other information, such as a requested quality level or bitrate, custom attributes, and information that identifies the particular fragment being requested.

Upon reception of the HSS Fragment Request (message 106) containing the fragment URI, the server (CDN) identifies the media with the requested quality level bitrate, builds the requested media fragment, and returns it in a Fragment Response (message 108). At the appropriate time, the UE will request the next fragment (message 110) and the CDN will provide it (message 112). This continues until the last fragment has been requested (message 114) and received (message 116) by the UE.

Diversity of end user applications consuming content over such ISP-CDN demands efficient security systems to protect the content as well as the content delivery infrastructure. In both cases the end users access content and associated infrastructure through the end users' specific CDN entry point, which is usually a designated edge node. This results in exposing the ISP-CDN to a range of threats, which could materialize over operator-authenticated devices and applications.

Relying on secrecy is insufficient. It is impractical to attempt to impose any strong assumption as to secrecy of the ISP-CDN topology: several methods exist to help chart CDNs, including redirectors (e.g., Domain Name System (DNS) Resource Record (RR)) and edge-server discovery (Internet Protocol (IP) addresses, etc.).

HSS requests and embedded URLs are therefore assumed to be forgeable. Video on Demand (VoD) does not always require the use of the HTTP Secure (HTTPS) protocol, hence a network sniffer can easily track HTTP VoD session messages (Digital Rights Management (DRM) is on top of HSS), and an attacker can deviate from the expected behavior shown in FIG. 1. For example, an attacker can simply start flooding the edge servers directly with fragment requests after a manifest has been received.

HTTP GET flooding Distributed Denial of Service (DDoS) attacks are difficult to filter because the attacker mimics legitimate client requests. In reality, the whole ISP-CDN system is exposed to attacks that are usually carried over HTTP and that target the nodes that provide the streaming content to the UE (e.g., the edge nodes) or the original source of the content (e.g., the content provider).

For example, an attacker may increase the load on the content provider by requesting massively unpopular VoD or random videos to the edge node(s). If a particular edge node does not currently have a cached copy of the video, that edge node will have to retrieve it from the content provider.

Relying on "certified devices" is not reliable. Although end user devices connected to the operator's access network are authenticated and sometimes are known to be "certified" by the operator, it cannot be assumed that end user devices will therefore never be a source of an attack on the CDN. There are known cases where an end-device product relies on open-source software, embedding open-resolvers, with a not-so-solid "certification" process in place (i.e., lacking advanced security penetration tests). Any new vulnerability found in an end user device may become an open door for launching attacks (hacked devices controlled by a bot or modified user-agents—unpatched browsers—are example of vulnerabilities). Also, the user of the UE may knowingly engage in the malicious behaviors.

Successfully securing an ISP-CDN is challenging as it should result in compliance between security policies, ISP network and resource constraints, and CDN service constraints. For instance, a content delivery policy imposed by the content owner may define requirements such as (1) the allowed streaming protocols (e.g., smooth streaming HSS, DASH, HLS, etc.) and (2) geo-location access control on the end users (i.e., only users from a certain region are allowed to access the given content).

The ISP-CDN system usually relies on generic security mechanisms to enforce content owner's requirements and to secure the CDN assets (e.g., edge servers, content, content origin, etc.). An example is the so-called Web Application Firewall (WAF).

WAFs are imperfect solutions. While WAFs and other firewalls provide some level of protection, WAFs are often configured statically and are typically "over provisioned," meaning that every WAF is configured with many rules that the particular WAF may never use or need. Moreover, application of WAF rules incurs a large resource overhead, which negatively affects performance of the node or nodes that host the WAF function. One reason for this reduction in performance is that WAF rules apply to all the traffic received by the web server. As a result, even though a WAF rule is needed for only a small portion of the traffic, that rule is in fact applied to all of the traffic—that is, all traffic is scrutinized according to that rule (and all of the other rules as well)—which consumes processing and storage resources unnecessarily.

Since traffic is comprised of many subflows, each requiring different specific checks, activating WAF rules often results in a waste of resources. Thus, operators must decide between two configuration approaches. The first is to configure the WAFs with only very generic WAF rules that apply to all or most traffic, which improves performance but provides reduced protection. The second is to configure the WAF with specific rules, which improves protection but reduces performance.

Currently, however, conventional WAFs do not have CDN-specific rules. Moreover, since a CDN network is typically not a standalone network but is instead an overlay on top of an existing network that handles many other types of traffic and applications, network operators may be resistant to further burdening their WAFs with CDN-specific rules, even if such rules existed. As a consequence, an operator may turn off such security mechanisms to improve performance, and thus expose the ISP-CDN to some vulnerabilities. There are a number of prior art approaches to address these vulnerabilities.

One conventional approach is to implement encrypted HSS fragment delivery between a server and the client. However, this approach does not protect the CDN from malformed or malicious requests for those fragments.

Another conventional approach is to implement a form of access protection that requires that the client IP address must be embedded in all fragment URL requests. This requirement may be specified in the manifest file, e.g., by defining the URL request template as containing the client IP address. More specifically, the IP address of the end user is present in the IP header as well as in the URL, so that a control on the URL can be applied based on the IP address, e.g., URLs containing a client IP address that is on an IP address blacklist may be blocked. However, this approach is only reactive, in that it requires that the user or device having that IP address must have been previously identified as a potential abuser and that the IP address in question must be present on the blacklist. Such an approach merely authenticates a user and provides no protection against a DDoS attack in which many thousands of non-blacklisted devices generate small amounts of traffic each but the total volume of which overwhelms a network node, for example.

Another conventional approach is to send a "signed cookie" to the client along with the manifest file; this cookie must be replayed by the client in every fragment request. In one conventional implementation of this approach, the cookie includes an identifier (ID), such as a session-ID (to identify the media ID), as well as key parameters (to verify the signature of this cookie, i.e., the signed hash), and a hash of the cookie (probably signed). Like the IP address approach above, however, the signed cookie approach merely authenticates a particular user but does not detect or protect against malicious behaviors, either intentional (e.g., a malicious user) or unintentional (e.g., a compromised device). Like the IP address approach above, the signed cookie approach is ineffective to stop DDoS attacks that mimic legitimate requests. As long as a cookie is not expired, a compromised user/client can flood the content server with many/frequent identical requests, which is an abnormal HSS behavior.

An additional weakness of conventional approaches is that requests for fragments are validated if the URL is appropriately signed, but each of the provided parameters is not checked individually. Instead, what is checked is whether or not the signature based on these parameters is valid. Access control is limited to URL pattern matching, i.e., conventional edge nodes only check whether or not a received request conforms to the pattern specified in the manifest file but have no knowledge of whether or not the parameters themselves are valid. Conventional edge nodes do not consider when particular fragments have been requested, the order in which fragments have been requested, or how many times particular fragments have been requested, for example. Moreover, not only does embedding a known value such as an IP address or signed cookie within each request fail to provide protection against many malicious behaviors, the additional data consumes extra bandwidth, i.e., it is an additional cost without a corresponding benefit.

SUMMARY

The subject matter of the present disclosure provides methods and systems for automatic provisioning of policies to control streaming content in a Content Delivery Network (CDN).

According to one aspect of the present disclosure, a method for automatic provisioning of security policies for content streaming control by a network node comprising circuitry and within a CDN that supports streaming media, comprises: obtaining a manifest, the manifest being generated in response to a user requesting a streaming content from the CDN; determining a first security policy associated with at least one of the user and the requested streaming content in accordance with the manifest; updating a set of firewall rules for implementing security policies in accordance with the determined first security policy; and applying the updated set of firewall rules to validate requests from the user for the streaming content.

In some embodiments, updating the set of firewall rules for implementing security policies in accordance with the determined first security policy comprises storing the updated set of firewall rules within the network node.

In some embodiments, obtaining the manifest comprises obtaining the manifest from a Manifest Delivery Function (MDF) that generates the manifest in response to receiving from the user a request for the streaming content.

In some embodiments, the method further comprises determining or receiving information related to network conditions, wherein the determining the first security policy for content streaming control is based also on the information related to network conditions.

In some embodiments, updating the set of firewall rules comprises aggregating or reordering at least two rules within the set of firewall rules.

In some embodiments, the updated set of policy rules comprises a rule for detecting a malformed request and for identifying a malformed request as invalid.

In some embodiments, the updated set of policy rules comprises a rule for validating a request for streaming content based on state information associated with the streaming content requested by the user.

In some embodiments, the state information associated with the streaming content requested by the user comprises at least one of:

information contained within the request for streaming content; and information associated with the request for streaming content but not contained within the request for streaming content.

In some embodiments, the rule for validating the request for streaming content based on state information associated with the streaming content requested by the user comprises a rule for identifying the request as invalid based on a number of times that the request has been repeated.

In some embodiments, the rule for validating the request for streaming content based on state information associated with the streaming content requested by the user comprises a rule for identifying the request as invalid based on an order in which the request has been issued relative to other requests.

In some embodiments, the method further comprises, upon validation of the request for streaming content, forwarding the request to the network entity for receiving requests for streaming content.

In some embodiments, the method further comprises, upon failure to validate the request for streaming content, not forwarding the request to the network entity for receiving requests for streaming content.

In some embodiments, the network entity for receiving requests for streaming content comprises a Video on Demand (VoD) Delivery Function (VDF).

In some embodiments, the network node within the CDN comprises an edge delivery node.

In some embodiments, the CDN supports at least one of: the Hypertext Transfer Protocol (HTTP) Smooth Streaming (HSS) protocol; the Dynamic Adaptive Streaming over HTTP (DASH) protocol; the HTTP Live Streaming (HLS) protocol; or any other protocol used for streaming media.

According to another aspect of the present disclosure, a network node for automatic provisioning of policies for video streaming control within a CDN comprises a network interface and processing circuitry configured to obtain a manifest, the manifest being generated in response to a user requesting a streaming content from the CDN, determine a first security policy associated with at least one of the user and the requested streaming content in accordance with the manifest, update a set of firewall rules for implementing security policies (stored in the node) in accordance with the determined first security policy; and apply the updated set of firewall rules to validate requests from the user for the streaming content.

In some embodiments, updating the set of firewall rules for implementing security policies in accordance with the determined first security policy comprises storing the updated set of firewall rules within the network node.

In some embodiments, obtaining the manifest comprises obtaining the manifest from a MDF that generates the manifest in response to receiving from the user a request for the streaming content.

In some embodiments, the network node is configured to determine or receive information related to network conditions, wherein the network node is configured to determine the security policy for content streaming control based also on the information related to network conditions.

In some embodiments, updating the set of firewall rules comprises aggregating or reordering at least two rules within the set of firewall rules.

In some embodiments, the updated set of policy rules comprises a rule for detecting a malformed request and for identifying a malformed request as invalid.

In some embodiments, the updated set of policy rules comprises a rule for validating the request based on state information associated with the streaming content.

In some embodiments, the state information associated with the streaming content requested by the user comprises at least one of:

information contained within the request for streaming content; and information associated with the request for streaming content but not contained within the request for streaming content.

In some embodiments, the rule for validating the request based on state information associated with the streaming content comprises a rule for identifying the request as invalid based on a number of times that the request has been repeated.

In some embodiments, the rule for validating the request based on state information associated with the streaming content comprises a rule for identifying the request as invalid based on an order in which the request has been issued relative to other requests.

In some embodiments, the network node is further configured to, upon validation of the request for streaming content, forward the request to the network entity for receiving requests for streaming content.

In some embodiments, the network node is further configured to, upon failure to validate the request for streaming content, not forward the request to the network entity for receiving requests for streaming content.

In some embodiments, the network entity for receiving requests for streaming content comprises a VDF.

In some embodiments, the network node within the CDN comprises an edge delivery node.

In some embodiments, the network node comprises an edge delivery node.

In some embodiments, the network node comprises: a CDN provisioner for determining the first information identifying a user and identifying a streaming content requested by the user, a Web Application Firewall for Content Delivery Networks Orchestrator (WCO), for determining the security policy for content streaming control based on the first information, and a Web Application Firewall for Content Delivery Networks (WAF-CDN) for applying the updated set of firewall rules to validate requests for streaming content.

In some embodiments, the CDN provisioner obtains the manifest by receiving or intercepting the manifest file for the streaming content requested by the user.

In some embodiments, the network node further comprises a Manifest Delivery Function (MDF) for receiving from a user a request for a streaming content manifest and providing to the user the manifest file for the streaming content requested by the user.

In some embodiments, the network node further comprises a Web Application Firewall for Manifest Delivery Functions (WAF-MDF) for validating requests for streaming content manifests and forwarding valid requests for streaming content manifests to the MDF.

In some embodiments, the network node further comprises a VDF for providing streaming content in response to receiving validated requests for streaming content from the WAF-CDN.

In some embodiments, the network node further comprises a rules database for storing and maintaining the security policies for content streaming control.

In some embodiments, the CDN supports at least one of: the Hypertext Transfer Protocol (HTTP) Smooth Streaming (HSS) protocol; the Dynamic Adaptive Streaming over HTTP (DASH) protocol; and the HTTP Live Streaming (HLS) protocol.

According to another aspect of the present disclosure, a communication system including a host computer comprises processing circuitry configured to provide user data and a communication interface configured to forward the user data to a cellular network for transmission to a User Equipment (UE), wherein the cellular network comprises a network node having a radio interface and processing circuitry. The processing circuitry is configured to determine or receive first information identifying a user and identifying a streaming content requested by the user, determine at least one policy for video streaming control based on the received information, and apply the determined at least one policy to validate requests from the user for the streaming content.

In some embodiments, the communication system further includes the network node.

In some embodiments, the communication system further includes the UE, wherein the UE is configured to communicate with the network node.

In some embodiments, the processing circuitry of the host computer is configured to execute a host application, thereby providing the user data; and the UE comprises processing circuitry configured to execute a client application associated with the host application.

According to another aspect of the present disclosure, a method implemented in a network node comprises determining or receiving first information identifying a user and identifying a streaming content requested by the user; determining at least one policy for video streaming control based on the first information; and applying the determined at least one policy to validate requests from the user for the streaming content.

According to another aspect of the present disclosure, a method implemented in a communication system including a host computer, a network node and a UE comprises, at the host computer, providing user data, and at the host computer, initiating a transmission carrying the user data to the UE via a cellular network comprising the network node, wherein the network node determines or receives first information identifying a user and identifying a streaming content requested by the user, determines at least one policy for video streaming control based on the received information, and applies the determined at least one policy to validate requests from the user for the streaming content.

In some embodiments, the method further comprises, at the network node, transmitting the user data.

In some embodiments, the user data is provided at the host computer by executing a host application, the method further comprising: at the UE, executing a client application associated with the host application.

According to another aspect of the present disclosure, a UE configured to communicate with a network node comprises a radio interface and processing circuitry. The processing circuitry is configured to send a manifest request for requesting a manifest for streaming content, receive a manifest response comprising the manifest for the streaming content, the manifest identifying the format of a request of the streaming content, and send, to the network node, a request for streaming content, the request complying with the format identified in the manifest.

According to another aspect of the present disclosure, a communication system including a host computer comprises: processing circuitry configured to provide user data; and a communication interface configured to forward user data to a cellular network for transmission to a UE. The UE comprises a radio interface and processing circuitry, which is configured to send a manifest request for requesting a manifest for streaming content, receive a manifest response comprising the manifest for the streaming content, the manifest identifying the format of a request of the streaming content, and send, to a network node, a request for streaming content, the request complying with the format identified in the manifest.

In some embodiments, the communication system further includes the UE.

In some embodiments, the cellular network further includes a network node configured to communicate with the UE.

In some embodiments, the processing circuitry of the host computer is configured to execute a host application, thereby providing the user data; and the UE's processing circuitry is configured to execute a client application associated with the host application.

According to another aspect of the present disclosure, a method implemented in a User Equipment, UE, comprising: sending a manifest request for requesting a manifest for streaming content; receiving a manifest response comprising the manifest for the streaming content, the manifest identifying the format of a request of the streaming content; and sending, to a network node, a request for streaming content, the request complying with the format identified in the manifest.

According to another aspect of the present disclosure, a method implemented in a communication system including a host computer, a network node and a User Equipment, UE, the method comprising: at the host computer, providing user data; and at the host computer, initiating a transmission carrying the user data to the UE via a cellular network comprising the network node, wherein the UE: sends a manifest request for requesting a manifest for streaming content; receives a manifest response comprising the manifest for the streaming content, the manifest identifying the format of a request of the streaming content; and sends, to the network node, a request for streaming content, the request complying with the format identified in the manifest.

In some embodiments, the method further comprises: at the UE, receiving the requested streaming content.

According to another aspect of the present disclosure, a UE configured to communicate with a network node comprises a radio interface and processing circuitry configured to send, to a network node, a request for streaming content.

According to another aspect of the present disclosure, a communication system including a host computer comprises a communication interface configured to receive user data originating from a transmission from a UE to a network node, wherein the UE comprises a radio interface and processing circuitry configured to send, to a network node, a request for streaming content.

In some embodiments, the communication system further includes the UE.

In some embodiments, the communication system further includes the network node, wherein the network node comprises a radio interface configured to communicate with the UE and a communication interface configured to forward to the host computer the user data carried by a transmission from the UE to the network node.

In some embodiments, the processing circuitry of the host computer is configured to execute a host application; and the UE's processing circuitry is configured to execute a client application associated with the host application, thereby providing the user data.

In some embodiments, the processing circuitry of the host computer is configured to execute a host application, thereby providing request data; and the UE's processing circuitry is configured to execute a client application associated with the host application, thereby providing the user data in response to the request data.

According to another aspect of the present disclosure, a method implemented in a UE comprises sending, to a network node, a request for streaming content.

In some embodiments, the method further comprises providing user data and forwarding the user data to a host computer via the transmission to the network node.

According to another aspect of the present disclosure, a method implemented in a communication system including a host computer, a network node and a UE comprises, at the host computer, receiving user data transmitted to the network node from the UE, wherein the UE sends, to the network node, a request for streaming data.

In some embodiments the method further comprises, at the UE, providing the user data to the network node.

In some embodiments the method further comprises, at the UE, executing a client application, thereby providing the user data to be transmitted; and at the host computer, executing a host application associated with the client application.

In some embodiments the method further comprises, at the UE, executing a client application, and at the UE, receiving input data to the client application, the input data being provided at the host computer by executing a host application associated with the client application, wherein the user data to be transmitted is provided by the client application in response to the input data.

According to another aspect of the present disclosure, a network node configured to communicate with a UE comprises a radio interface and processing circuitry. The processing circuitry is configured to determine or receive first information identifying a user and identifying a streaming content requested by the user, determine at least one policy for video streaming control based on the received information, and apply the determined at least one policy to validate requests from the user for the streaming content.

According to another aspect of the present disclosure, a communication system includes a host computer comprising a communication interface configured to receive user data originating from a transmission from a UE to a network node. The network node comprises a radio interface and processing circuitry, the processing circuitry configured to determine or receive first information identifying a user and identifying a streaming content requested by the user, determine at least one policy for video streaming control based on the received information, and apply the determined at least one policy to validate requests from the user for the streaming content.

In some embodiments, the communication system further includes the network node.

In some embodiments, the communication system further includes the UE, wherein the UE is configured to communicate with the network node.

In some embodiments, the processing circuitry of the host computer is configured to execute a host application, and the UE is configured to execute a client application associated with the host application, thereby providing the user data to be received by the host computer.

According to another aspect of the present disclosure, a method implemented in a network node comprises determining or receiving first information identifying a user and identifying a streaming content requested by the user, determining at least one policy for video streaming control based on the first information, and applying the determined at least one policy to validate requests from the user for the streaming content.

According to another aspect of the present disclosure, a method implemented in a communication system including a host computer, a network node and a UE comprises, at the host computer, receiving, from the network node, user data originating from a transmission which the network node has received from the UE, wherein the UE sends, to the network node, a request for streaming content.

In some embodiments, the method further comprises, at the network node, receiving the user data from the UE.

In some embodiments, the method further comprises, at the network node, initiating a transmission of the received user data to the host computer.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 12 through 15 are flowcharts illustrating methods implemented in a communication system including a host computer, a network node, and a UE in accordance with some embodiments of the present disclosure.

DETAILED DESCRIPTION

Figure 1:
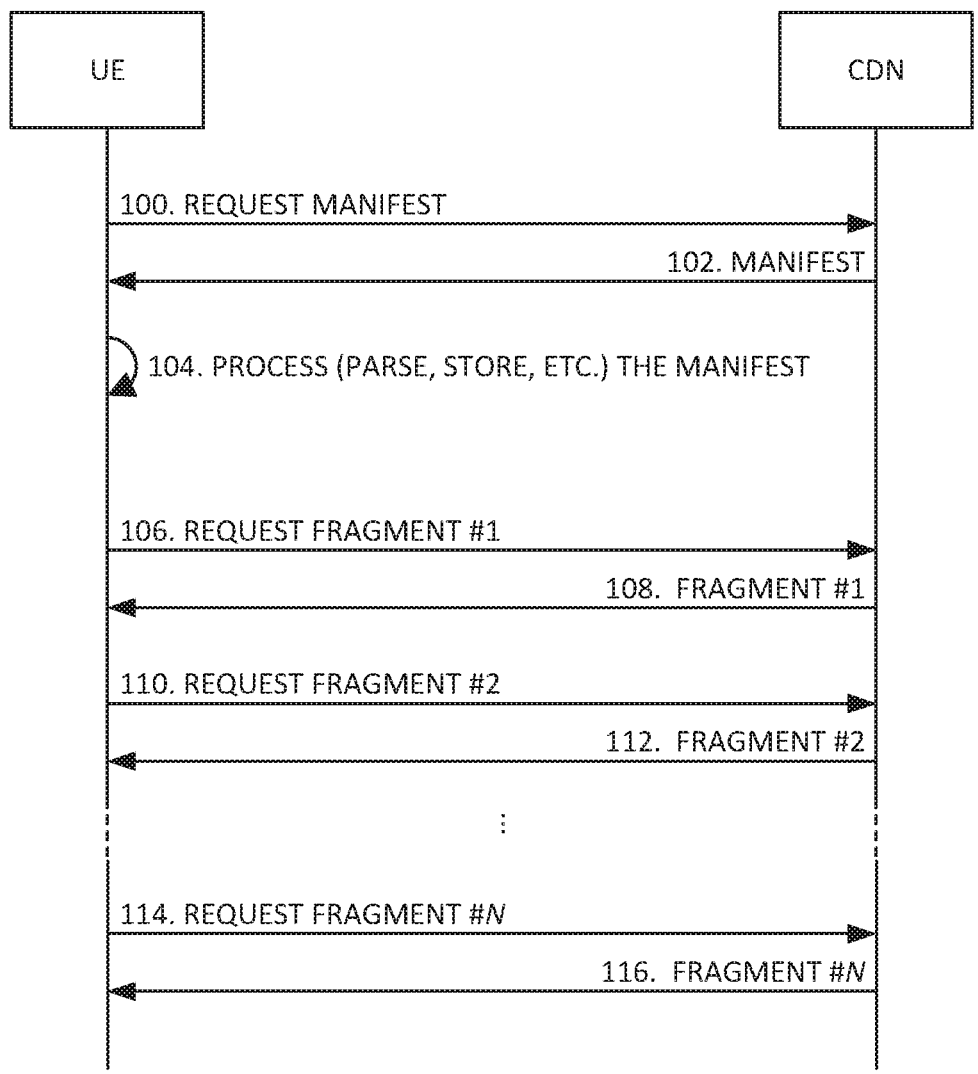
FIG. 1 illustrates a simplified example of an typical interaction between a User Equipment (UE) and Content Delivery Network (CDN)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" refers to a device capable, configured, arranged, and/or operable to communicate wirelessly with network nodes and/or other wireless devices. Unless otherwise noted, the term wireless device may be used interchangeably herein with UE. Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over Internet Protocol (IP) (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A wireless device may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a Machine Type Communication (MTC) device. As one particular example, the wireless device may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Network Node: As used herein, a "network node" is any node that is either part of the radio access network or the core network of a cellular communications network/system. In particular, a network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs) and base stations (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

While the interaction illustrated in FIG. 1 is an example of a legitimate interaction between a User Equipment (UE) and a Content Delivery Network (CDN), not all interactions are legitimate. Suspicious requests may be categorized into two general types: those that are malformed Hypertext Transfer Protocol (HTTP) requests and HTTP traffic not compliant with the Video on Demand (VoD) streaming protocol; and those that are (or look like) legitimate requests that have been forged and replayed in abnormal number, rate, patterns. Any CDN security solution enforcing a content delivery policy specifying HTTP Smooth Streaming (HSS) should therefore permit only HSS compliant HTTP traffic. Servers streaming video benefit from generic Internet Protocol (IP)/Transmission Control Protocol (TCP)/HTTP protection, but there is little enforcement of protection at the streaming protocol outside a Uniform Resource Locator (URL) signing mechanism that only validates the URL parameters.

Conventional Web Application Firewalls (WAFs) are not intended specifically for CDN delivery and instead focus more on rules that address HTTP or TCP requests, but not on the traffic that such requests generate, e.g., "application over HTTP." WAFs may have rules for specific applications—rules to protect against Structured Query Language (SQL) injection, for example—but to date specific CDN applications such as HSS delivery are not addressed. Thus, CDN applications—such as HSS delivery are currently not addressed by a specific set of WAF rules. Furthermore, in conventional implementations, WAF rules are statically configured, are expected to apply in a generic way, and are not designed to be activated and configured on a per query or subflow basis. For example, some conventional webservers provide means to dynamically activate or deactivate a rule, but the activated rule applies to all traffic reaching the web server. As a result, a security mechanism such as WAF is often perceived as performing poorly because conventional WAFs are not optimized for the CDN application itself, i.e., WAFs usually come with a generic flavor, and because WAF rules are managed inappropriately. To our knowledge, there is no WAF optimized for CDN.

The methods and systems disclosed herein not only detect and address malformed requests for CDN content but also detect malicious behaviors that involve requests that appear to be legitimate. This is achieved by the use of a WAF that is adapted (e.g., optimized) for streaming content, including, but not limited to HSS and other streaming protocols, referred to herein as a WAF for CDN, or simply "WAF-CDN." The WAF-CDN has knowledge of the current state of a streaming content, and can use this knowledge, along with knowledge about the specific user that requested the specific streaming content, to detect malicious behaviors that cannot be detected by existing WAFs. The WAF-CDN may acquire such knowledge by intercepting a streaming content manifest file that is being sent to a user and parsing the intercepted manifest file for metadata, parameters, or other information, which the WAF-CDN can then use to update firewall rules, security policies, and the like. Because each manifest is uniquely associated with a particular user and a particular streaming content, the dynamic policies can also be uniquely associated with that user request.

In some embodiments, a WAF-CDN Orchestrator (WCO) is employed to manage and administer (orchestrate) one or more WAF-CDN nodes. In some embodiments, network entities called CDN provisioners monitor network traffic for information that may be provided to the WCO, which the WCO can use to intelligently configure the WAF-CDN. In some embodiments, the functions of providing a manifest for streaming content and providing the streaming content itself are separated into a Manifest Delivery Function (MDF) and a VoD Delivery Function (VDF), respectively. These and other CDN components will now be described in detail.

Figure 2:
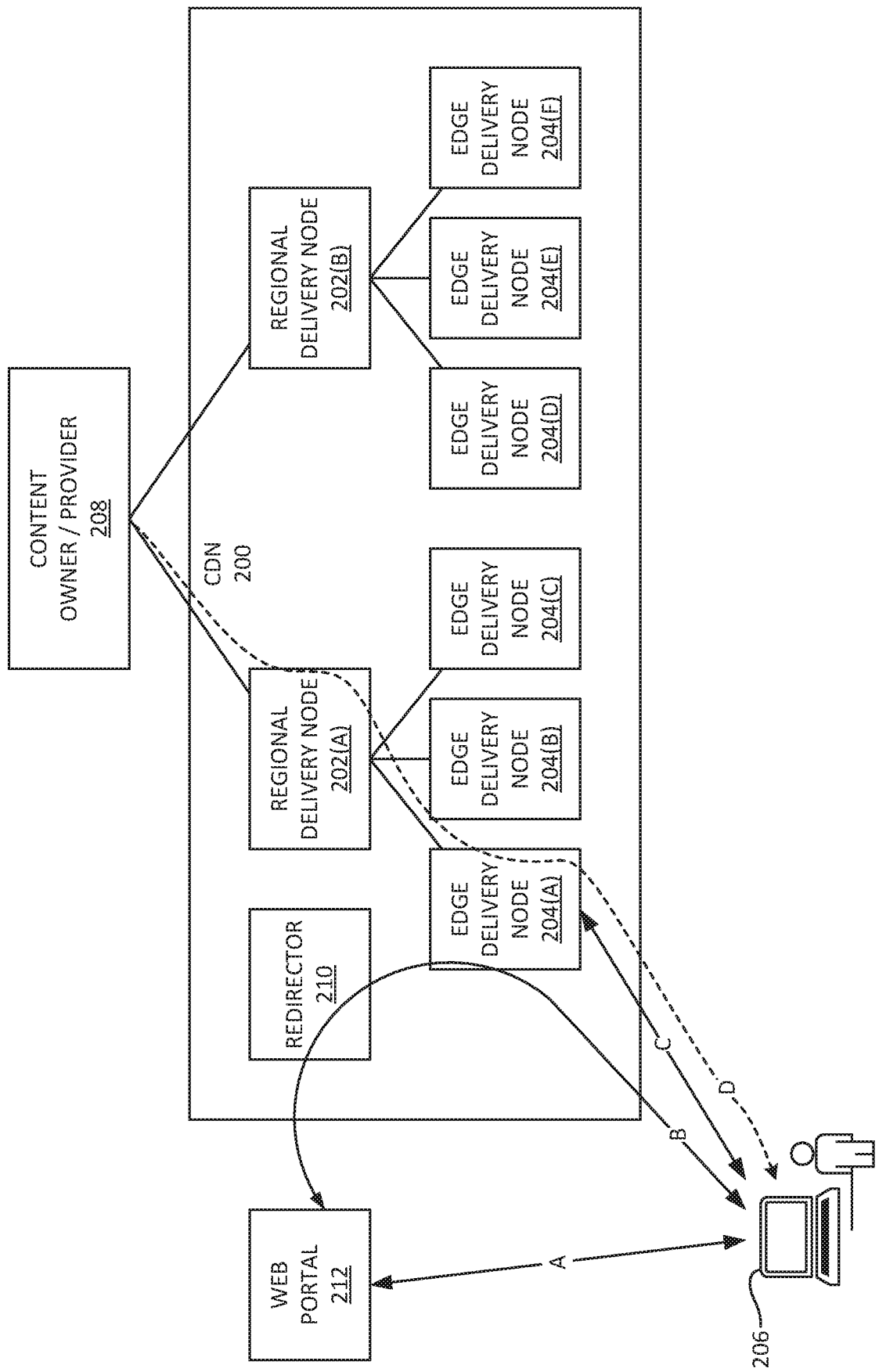
FIG. 2 is a schematic block diagram illustrating an exemplary CDN in accordance with some embodiments of the present disclosure.

FIG. 2 is a schematic block diagram illustrating an exemplary CDN in accordance with some embodiments of the present disclosure. The CDN 200 includes one or more regional delivery nodes 202 and one or more edge delivery nodes 204, which may also be referred to as "edge nodes 204." When a consumer 206 requests particular content, e.g., a VoD, that content is provided by a content provider 208 (also referred to herein interchangeably as "the content owner 208") to a regional delivery node 202, which forwards the content to an edge delivery node 204, which caches some or all of the content. In the example shown in FIG. 2, the content is sent to regional delivery node 202(A), which sends the content to edge delivery node 204(A), which provides the content to the consumer 206.

It will be understood that the terms "consumer" and "user" refer to a human consumer of the content, and that the terms "user equipment" or "UE" refer to the hardware that receives the provided content and that displays the provided content to the human user. When the UE is controlled by the human user, the terms "user" and "UE" are treated as synonymous unless specifically stated otherwise. For this reason, the element number 206 is used herein to refer to either the user or the UE, depending on the context. For example, the user 206 may decide to make a request for content; that request may be made using the UE 206; that content may be delivered to the UE 206 and viewed by the user 206.

In the embodiment illustrated in FIG. 2, the CDN 200 includes a redirector 210, which accepts requests from the consumer 206 for content and redirects the requests to one of the edge nodes 204, e.g., to the edge node 204 that is closest to the consumer 206 and/or that happens to contain a cached copy of the content being requested by the consumer 206. The CDN 200 in FIG. 2 also includes a web portal 212 that may display the catalog of available content to the consumer 206 and that may provide the mechanisms by which the consumer 206 may request particular content from the content provider 208.

Conceptually speaking, an ISP-CDN (and a CDN in general) is an overlay network mainly composed of caching edge nodes 204, request redirectors 210, and possibly a content ingestion node (interfacing the content owner 208), together with other network functions allowing management of CDN assets. The main objective is to deliver content to end users in ways to optimize quality of experience. An operator might benefit from such architecture to develop new business models.

HTTP Smooth Streaming (HSS)

An ISP-CDN is usually optimized for a CDN application. One important CDN application deployed in an ISP-CDN is VoD. In order to expand the VoD to a larger diversity of end users and devices (e.g., set-top-boxes, mobile phones, tablets, etc.), the content owner most often demands VoD HSS content delivery. HSS is very attractive given its feature of bit adaption rates in near-real-time.

HSS specifies the "wire format" used to deliver media over HTTP, enabling the client (end user device) to request media quality changes in near-real-time. The original media is typically encoded and stored in several MP4 format profiles, one profile per quality level (e.g., compression or bitrates).

An HSS session starts with the client (UE 206) acquiring a description file—the so called manifest file—containing media metadata allowing the client to issue legitimate subsequent requests of media fragments. This is shown in FIG. 2 as the following communications:

(A) The end user uses UE 206 to access the web portal 212 of the content owner 208.

(B) The end user's requests are redirected to the request redirector 210. During this phase of communications, the UE 206 requests, and receives, a manifest file. In the embodiment illustrated in FIG. 2, the manifest file is intercepted by the edge delivery node 204(A), which extracts from the intercepted manifest file information about the user and information about the streaming content requested by the user. This information is used to determine and/or activate one or more policies for content (e.g., video) streaming control. These policies can be very specifically tailored to a particular user and a particular streaming content.

(C) The user 206 then issues requests for media fragments. The user's 206 requests for fragments contain Identifiers (IDs), such as VoD ID, bitrate profile, and time offsets or other time-related parameters identifying fragments. The user's 206 HSS client (e.g., a mobile app that streams videos or other content) is responsible to demand changes of the bitrates. The requests for fragments are evaluated using the policies for content streaming control, and invalid requests are rejected or ignored.

(D) In response to valid requests for fragments, the CDN 200 streams the content from the content provider 208 down through the appropriate regional delivery mode (202(A)) and edge delivery node (204(A)) to get to the UE 206.

The edge delivery node 204(A) will typically keep a cached copy of the content for a period of time in case the UE 206 or another user requests the same content again. The regional delivery node 202(A) may also keep a cached copy of the content, especially if the content is particularly popular and may eventually be forwarded to any others of the edge delivery nodes 204, e.g., 204(B) or 204(C). The manifest file delivery node may be under the control of the content owner (i.e., portal) or the ISP-CDN. The example shown in FIG. 2 assumes the latter. The example CDNs described herein are intended to be illustrative and not limiting: the concepts described herein may be applied to any type of CDN, e.g., any type of wired and/or wireless network, any type of content delivery service, any type of streaming protocol, etc.

Figure 3:
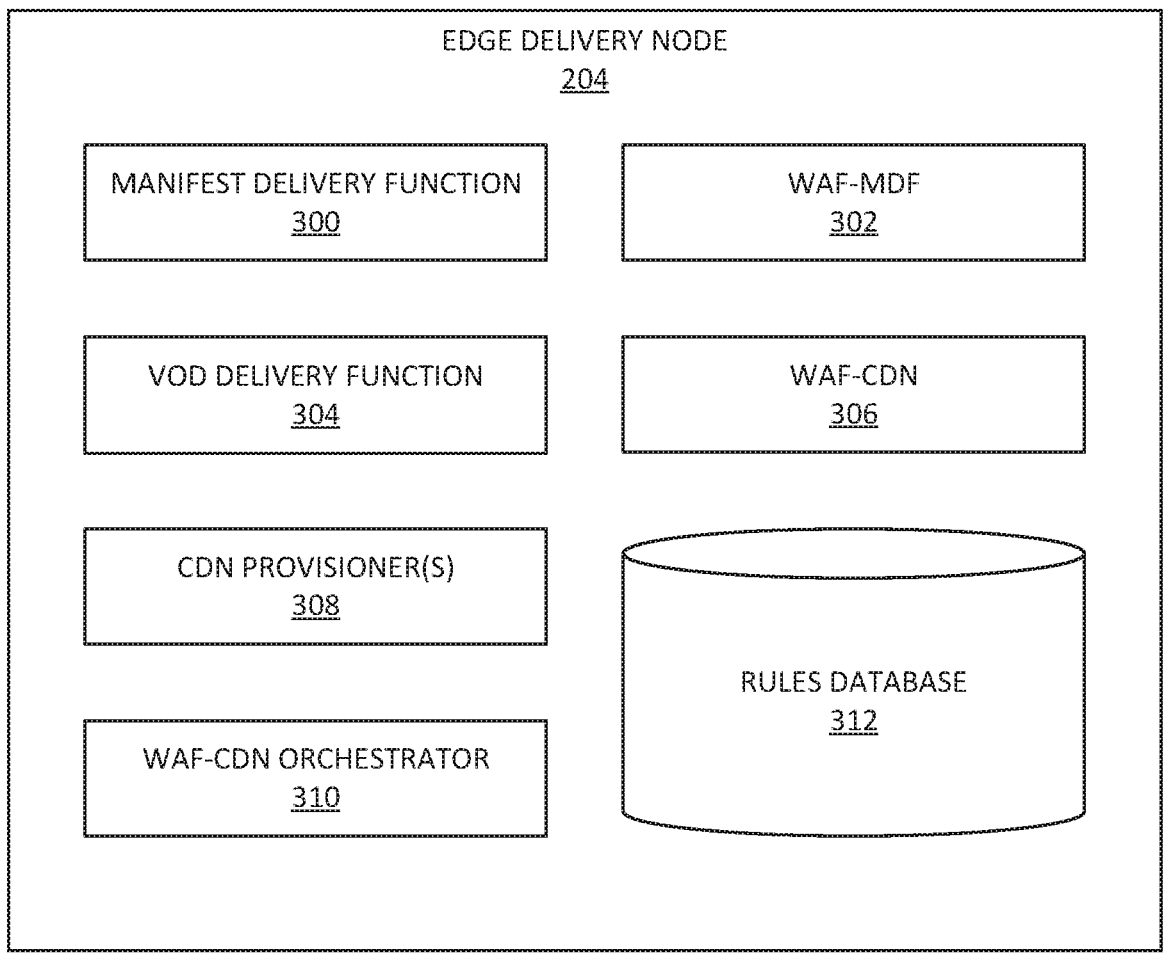
FIG. 3 is a schematic block diagram illustrating an exemplary edge node in accordance with some embodiments of the present disclosure.

FIG. 3 is a schematic block diagram illustrating an exemplary edge delivery node in accordance with some embodiments of the present disclosure. In the embodiment illustrated in FIG. 3, the edge delivery node 204 includes the following components.

A Manifest Delivery Function (MDF) 300 is in charge of delivering the manifest. The manifest is a file which indicates, among other things, the format of the URL that the end user needs to use when requesting fragments of the desired content. The MDF 300 receives a request for a manifest, also referred to as a "manifest request," and responds by sending a manifest, also referred to as a "manifest response." In some embodiments, the MDF 300 authorizes access to the streaming service, and the manifest file operates as authorization for a specific end user to stream a VoD. In some embodiments, the information provided by the manifest response provides the information needed for the UE 206 to access the service in general and/or to access the specific content in particular.

A WAF for MDF (WAF-MDF) 302 comprises a standard WAF that is statically configured to filter manifest requests before those requests are received by the MDF 300. Thus, the WAF-MDF 302 protects the MDF 300 by filtering out malformed or otherwise improper requests. For example, the WAF-MDF 302 typically checks that the URL format is correct and that the file being requested is the right type, i.e., a manifest file. Typically, requests for file types other than *.ism and *.isml files are rejected.

A VoD Delivery Function (VDF) 304 is in charge of delivering or streaming the VoD. In some of the examples presented herein, the protocol used between the end user and this function is the streaming protocol HSS, but the same concepts described herein may be applied to other protocols, including, but not limited to, Dynamic Adaptive Streaming over HTTP (DASH), HTTP Live Streaming (HLS), or any protocol used for streaming data, especially those that include a state machine, e.g., where a session starts with first metadata of the requested content, followed by requests for chunks or segments. It will be understood that protocols may refer to portions of streaming content as "chunks," "segments," "fragments," or similar; e.g., a portion of a streaming video may be referred to as a "video chunk," "video segment," "video fragment," etc., according to the naming convention defined by the particular protocol. Thus, the terms "chunk," "segment," "fragment," or other terms having similar meanings may be used interchangeably herein.

A WAF-CDN 306 provides protection to the VDF 304 by inspecting the HTTP requests for content and checking whether they are compliant with the currently active policies for content streaming control. One aspect of compliance is that the request be compliant with the information provided by the MDF 300. The WAF-CDN 306 may also perform additional policy compliance operations, such as anti-replay protection, for example. One characteristic of the WAF-CDN 306 is that it is dynamically configurable. In some embodiments, the configuration is only valid for a limited number of requests.

The WAF-CDN 306 is capable of a variety of functions, including, but not limited to, being able to verify whether or not the URL has an appropriate format according to the information provided by the manifest, and to take appropriate action if the URL is not in the appropriate format. More specifically, a request for a streaming content fragment, for example, includes (or is) a URL that must match a pattern specified by the manifest file. If the request does not comply with the specified pattern, the WAF-CDN 306 may take appropriate action, such as rejecting, denying, ignoring, or redirecting such requests. In some embodiments, the WAF-CDN 306 can assert that the URL is appropriate for a specific number of users. In some embodiments, the selection of sources and/or users may be performed by a Software-Defined Network (SDN) instead, and/or with a combination of other filtering rules. In addition, in some cases the WAF-CDN 306 may also be able to provide anti replay protection of specific queries as well as implementing other streaming policies by following the streaming—e.g., by preventing small jumps between the media chunks.

In some embodiments, the functions of the WAF-CDN 306 are defined by streaming protocol filtering policies. When HSS is the streaming protocol, the streaming protocol filtering polices may also be referred to as the HSS filtering policies. Streaming protocol filtering policies define and/or control what requests should be accepted by the VDF 304. In one embodiment, streaming protocol filtering policies may be categorized as static versus dynamic. For example, a static policy may be a policy that is applicable everywhere (e.g., never accept streaming requests from blacklisted IP addresses), while a dynamic policy may be a policy that is context-specific and thus subject to change.

One example of a static policy is to reject any request that does not follow the URL format defined by the manifest. Another example policy is whether or not to consider the IP address as a filtering parameter. Another example policy is whether or not to filter based on transport layer, parameters used, and/or which HTTP options were used, as well as which values are allowed or not allowed for each of the above.

Dynamic policies may change based on a specific context, such as the state of the streaming content and metadata associated with the user that requested the streaming content. For streaming requests, for example, some parameters are not specified by the manifest itself, such as the number of times a video or a chunk (video fragment) is allowed to be replayed. Policies may define which of such parameters should be considered and what parameter values are acceptable. Another example policy is whether or not chunks may be skipped (for instance, a policy rule may dictate that some chunks, like the first one or two chunks of a streaming protocol session, may not be skipped, e.g., because those chunks are likely to contain an advertisement.

Other policies may include policies that are activated or deactivated in response to network conditions such as traffic loading and/or user-specific conditions, such as when a user has exceeded an allotted capacity, a maximum data rate, or other limit. Still other policies may be put into effect upon detection of a particular condition or event, before, during or after content is being streamed. For example, policies to throttle streaming bandwidth may be put into place upon detection of high network utilization (e.g., heavy network traffic), including when such a condition is the result of a DoS/DDoS attack. These factors may also be considered by the WAF-CDN 306 or other node while determining what policies should be put into place or activated, as well as determining what policies are no longer necessary and should be deactivated or removed.

In some embodiments, the WAF-CDN 306 determines what policies to implement, e.g., based on analysis of instantaneous or historical data, or other types of behavior detection. In some embodiments, the WAF-CDN 306 is configured or otherwise controlled by an entity other than itself. In the embodiment illustrated in FIG. 3, the selection of which policies or rules to install on the WAF-CDN 306 and/or the selection of which of the installed policies or rules to activate or deactivate, is handled by CDN provisioner(s) 308, which monitor traffic to determine real-time conditions, and a WAF-CDN Orchestrator (WCO) 310, which uses the information provided by the CDN provisioner(s) 308 to determine which policies or rules should be downloaded to, activated within, or deactivated/deleted from, the WAF-CDN 306. These will now be described in detail.

The CDN provisioner 308 is responsible for monitoring the network to detect information pertinent to the CDN, e.g., information that may be used to determine when an update should be made to the streaming protocol filtering policies and/or what that update should be. In the embodiment illustrated in FIG. 3, for example, the CDN provisioner 308 intercepts manifest response messages sent from the MDF 300, scans those messages for transmitted parameters or other pertinent data, and provides that data to the WCO 310.

An Example Manifest File

An example manifest file is shown below:

```
<?xml version="1.0" encoding="UTF-8"?>
<SmoothStreamingMedia MajorVersion="2" MinorVersion="0"
    Duration="2300000000" TimeScale="10000000">
  <Protection>
    <ProtectionHeader
        SystemID="{9A04F079-9840-4286-AB92E65BE0885F95}
        ">
```

-continued

```
    </ProtectionHeader>
  </Protection>
  <StreamIndex Type="video" Chunks="115" QualityLevels="2"
      MaxWidth="720" MaxHeight="480" TimeScale="100000000"
      Name="video"
      URL="QualityLevels({bitrate},{CustomAttributes})/
      Fragments(video={start_time})">
    <QualityLevel Index="0" Bitrate="1536000" FourCC="WVC1"
        MaxWidth="720" MaxHeight="480">
      <CustomAttributes>
        <Attribute Name="Compatibility" Value="Desktop" />
      </CustomAttributes>
    </QualityLevel>
    <QualityLevel Index="5" Bitrate="3072000" FourCC="WVC1"
        MaxWidth="720" MaxHeight="480">
      <CustomAttributes>
        <Attribute Name="Compatibility" Value="Handheld" />
      </CustomAttributes>
    </QualityLevel>
    <c t="0" d="19680000" />
    <c n="1" T="19680000" d="8980000" />
  </StreamIndex>
</SmoothStreamingMedia>
```

An example request is shown below:

http://video-provider.com/videoName.ism/
QualityLevels({bitrate}, {CustomAttribures})/
Fragments(video={start_time})

Where the .ism name identifies the media, the QualityLevels identifies the right profile, and the chunk is identified with the fragment offset (Ser. No. 19/680,000), i.e., it would correspond to the second chunk.

Based on this manifest file, for example, a first set of WAF rules can be derived with parameters from the name of the requested .ism media, existing profiles, and regular expressions to identify the chunks. In some embodiments, the URL pattern may be modified to allow the WAF-CDN 306 to enforce the state of the streaming content.

The WCO 310 is responsible orchestrating the configuration of one or more WAF-CDNs 306, which includes dynamically configuring or reconfiguring the WAF-CDN 306 based on information provided by one or more of the CDN provisioners 308. In some embodiments, the WCO 310 is responsible for collecting information from the CDN provisioner(s) 308 and determining the appropriate WAF-CDN rules, filtering policies, and SDN configurations. In some embodiments, WAF-CDN rules are defined based on the information received by the CDN provisioner(s) 308 as well as configuration parameters. In some embodiments, the WAF-CDN rules must conform to the streaming protocol filtering polices. However, other WAF rules, such as anti-reply, for example, may also be defined outside the scope of the information received from the CDN provisioner(s) 308.

In addition, CDN provisioner(s) 308 may also provide some information necessary to conform to the streaming protocol filtering policies but that requires dynamic configuration of other elements such as firewalls, SDN configuration, or any specific service function. Typically, if the IP address is considered as a filtering element to avoid a VoD being streamed by different IPs, then IP filtering may be performed by appropriately configuring the IP to a dedicated WAF-CDN 306, or simply to a specific WAF-CDN 306 that also considers the IP address. In some embodiments, WAF rules should apply as much as possible to the HTTP layer and above. Thus, IP filtering may require some collaboration between multiple elements. The WCO 310 is responsible for this.

In some embodiments, the WCO 310 may be responsible for updating the WAF-CDNs 306 and other elements. In some embodiments, this may include not only providing (or "pushing") the rules to the WAF-CDN 306, but also performing some optimization, such as performing rule ordering based on information received from the various elements. Updating the WAF-CDN 306 may also include deleting those WAF rules that are no longer used. A typical example that may be implemented in the WCO 310 as well as in the WAF-CDN 306 itself might include pushing the various WAF-CDN rules provided by the manifest, and, once the end user has selected one way to perform the streaming, deleting rules that do not apply to the selected manner of streaming (or that apply only to non-selected manners of streaming).

In some embodiments, the WCO 310 may receive pertinent information from other nodes. For example, in some embodiments, the MDF 300 may provide the WCO 310 with additional information, such as parameters that do not appear in a manifest response message and thus would not be available to the CDN provisioner(s) 308. In some embodiments, the information provided by the CDN provisioner(s) 308 may be used to determine dynamically configured rules, e.g., rules that are activated or not activated based on specific VoD or other content being streamed. However, the CDN provisioner(s) 308 may be able to provide information relating to statically configured rules: rules of this nature may be dictated by the network operator, in which case the WCO 310 would likely receive the rules (or the information used to make those rules) from a node other than the CDN provisioner(s) 308 or the MDF 300.

In some embodiments, multiple CDN provisioners 308 may be configured to provide different kinds of information. For example, each CDN provisioner 308 may provide information related to a different layer, such as HSS, HTTP, TCP/IP, etc. For example, the profile bitrates can be extracted in order to further enforce the appropriate rate limiting rules for the WAF-CDN 306. In some embodiments, if the ISP is aware that no Network Address Translation (NAT) occurs, filtering may include L3 filtering based on the IP addresses or IP prefix, in which case a CDN provisioner (308) could provide that information to the WCO 310. For HTTP the CDN provisioner 308 could provide to the WCO 310 information extracted from the HTTP stream, such as the device description, or the type of browser, for example.

In some embodiments, the WAF-CDN 306 may create rules that are based on parameters of the streaming protocol as well as lower layers (e.g., IP, TCP, Transport Layer Security (TLS), HTTP, etc.) defined by the MDF 300. These parameters may be provided in the manifest response. In some embodiments, it is the responsibility of the CDN 200 operator to define which parameters are useful and should be reported to the WCO 310 by the CDN provisioner(s) 308.

A Rules Database 312 stores and maintains rules that are defined, identified, and/or selected by the WCO 310 for use by the WAF-CDN 306. Although shown as a single entity in FIG. 3, it will be understood that in alternative embodiments, the rules database 312 may comprise multiple databases and that each of the other functions (e.g., the MDF 300, the WAF-MDF 302, etc.) may contain all or part of the rules database 312 and also may contain all or part of other databases.

In the embodiment illustrated in FIG. 3, all of the components illustrated are contained within an edge delivery node 204, but in alternative embodiments, some of these functions may be located in different nodes or distributed among different nodes. An example operation of a CDN 200 having an edge delivery node 204 according to an embodiment of the present disclosure will now be described using FIG. 4.

Figure 4:
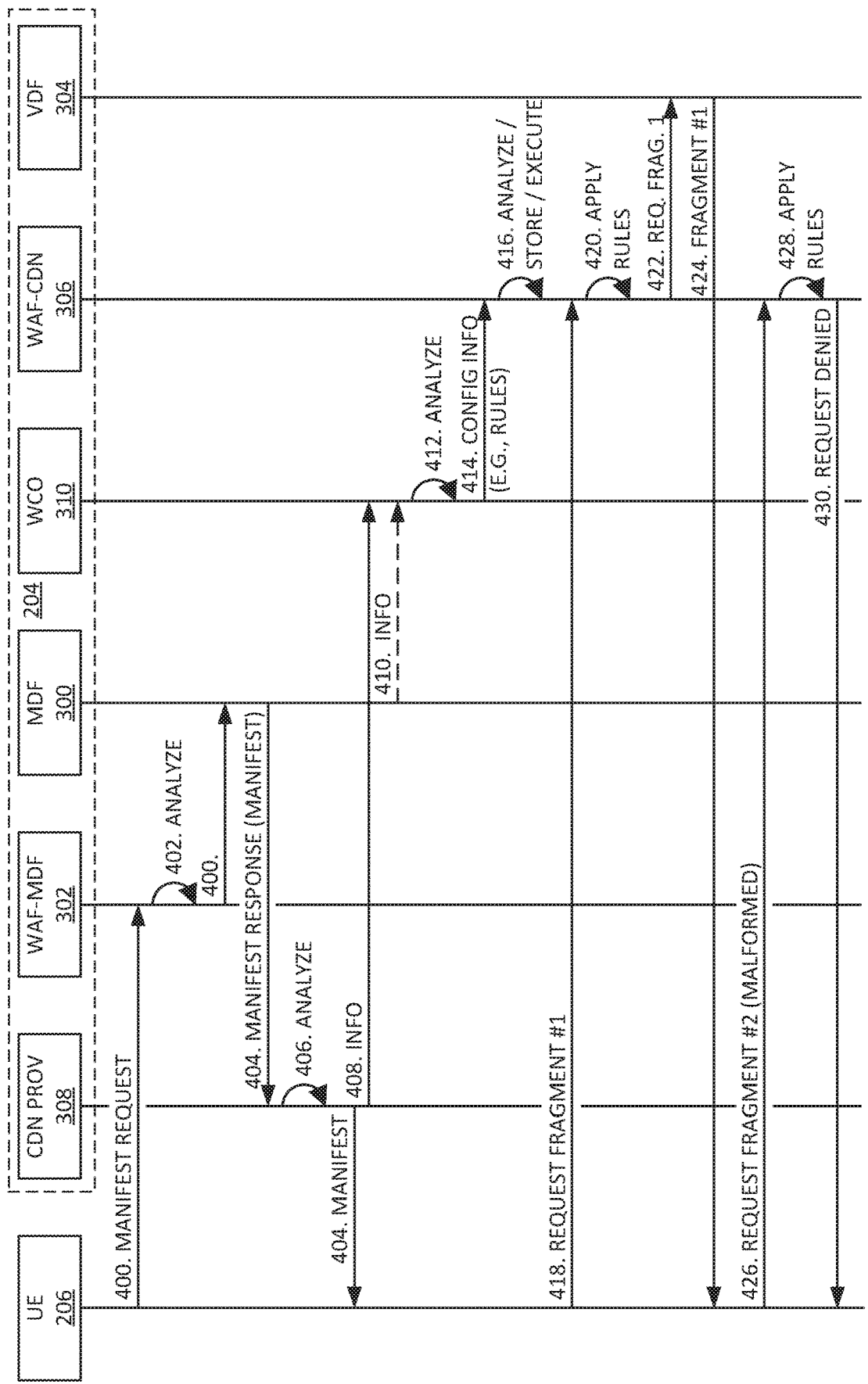
FIG. 4 is a signaling message diagram illustrating signals communicated among components of an exemplary system in accordance with some embodiments of the present disclosure.

FIG. 4 is a signaling message diagram illustrating signals communicated among components of an exemplary system for automatic provisioning of policies for content streaming control in CDN operating in accordance with some embodiments of the present disclosure. In the embodiment illustrated in FIG. 4, the CDN includes the MDF 300, WAF-MDF 302, VDF 304, WAF-CDN 306, CDN provisioner 308, and WCO 310, the functions of which are essentially identical to the corresponding like-numbered elements in FIG. 3 and therefore will not be repeated here.

In the embodiment illustrated in FIG. 4, the UE 206 issues a manifest request (message 400) for a manifest of some desired content, e.g., a VoD that the user of the UE 206 wants to view. The request is received by the WAF-MDF 302, which analyzes (step 402) the request, e.g., parses the request to make sure that it has the proper format, that it doesn't come from a blacklisted user or address, etc. In the example shown in FIG. 4, the request is legitimate, and so the WAF-MDF 302 forwards the request to the MDF 300. The MDF 300 issues a manifest response message 404, which includes the manifest.

In the embodiment illustrated in FIG. 4, the manifest response message 404 is intercepted by the CDN provisioner 308, which analyzes (step 406) the contents of the manifest response message 404 and forwards the manifest response message 404 to the UE 206. In the embodiment illustrated in FIG. 4, the CDN provisioner 308 sends information (message 408) to the WCO 310. In some embodiments, the information within message 408 may include information from the manifest response message 404 and/or from the manifest itself. In some embodiments, the information within message 408 may include information that was derived from information contained within or associated with the manifest response message 404 and/or the manifest itself. In some embodiments, the information within message 408 may include meta-information about the manifest response message 404, such as the date and time of the message, etc.

In the embodiment illustrated in FIG. 4, the manifest response message 404 is received (and analyzed) by a single CDN provisioner 308, but in alternative embodiments, the manifest response message 404 may be received and analyzed by multiple CDN provisioners 308, e.g., where each CDN provisioner 308 checks for different parameters, checks different levels of the communication stack, and so on.

As illustrated in FIG. 4, the WCO 310 may also receive additional information (message 410) from the MDF 300. As described above with regard to FIG. 3, in some embodiments, the additional information contained within message 410 may be information that is not present in the manifest response message 404, that is therefore unavailable to the CDN provisioner 308, and thus cannot be reported by the CDN provisioner 308 to the WCO 310. It will be understood that the WCO 310 may also receive other information and/or receive information from other network entities, including from the network operator or the entity that administers the CDN 200. The information received may be from a variety of sources and may be of a variety of types, including, but not limited to, application-specific information, information from the CDN 200, information in the communication protocol, information from a user's Service Level Agreement (SLA), and other user-specific data (e.g., the user's data consumption, the user's data plan, parental controls, etc.) It will be understood that such information may comprise data or meta-data.

In the embodiment illustrated in FIG. 4, the WCO 310 analyzes (step 412) the information received, and, if needed, configures the WAF-CDN 306 with configuration information (message 414). The configuration information may include new rules and/or instructions (e.g., activate, deactivate, delete) to be applied to rules already existing within the WAF-CDN 306.

In the embodiment illustrated in FIG. 4, the WAF-CDN 306 analyzes, stores, and/or executes (step 416) the configuration information received from the WCO 310. For example, the configuration information may include a new rule to be stored and perhaps activated. The configuration information may include an instruction to activate, deactivate, or delete a pre-existing rule. These examples are illustrative and not intended to be limiting.

In the embodiment illustrated in FIG. 4, the UE 206 then begins to request fragments of the desired video content. In the embodiment illustrated in FIG. 4, the UE 206 issues a request (message 418) for the first fragment. This request is directed towards the VDF 304 but is intercepted by the WAF-CDN 306, which analyzes the request, e.g., by applying policy rules (step 420). In the example shown in FIG. 4, the first request message 418 is allowed through to the VDF 304 (message 422), and the VDF 304 responds to the first request message 418 by providing the first fragment (message 424) to the UE 206.

In the embodiment illustrated in FIG. 4, the UE 206 then requests another fragment (message 426), but in this example, the request is malformed. As a result, when this malformed request message 426 is intercepted by the WAF-CDN 306 and analyzed (step 428), the WAF-CDN 306 determines that the request is malformed and the packet is therefore treated as a suspicious request. In the embodiment illustrated in FIG. 4, the WAF-CDN 306 refuses to forward the request message 426 to the VDF 304 and instead sends a request denied message 430 to the UE 206.

Alternatively, the WAF-CDN 306 might simply ignore the malformed request message 426, e.g., by simply not responding at all.

In some embodiments, the WAF-CDN 306 can rely on the coordination of other nodes that are responsible for routing the appropriate traffic (e.g., to or from end users) to the appropriate WAF-CDN 306. For example, when a user 206 selects VoD content, e.g., via a web portal 212 in FIG. 2, the redirector 210 may identify the best edge node 204 to serve the user 206.

In some embodiments, the security policy or policies for the WAF-CDN 306 may be set dynamically per instances of each requested manifest. For example, the security policies for the WAF-CDN 306 may be set dynamically based on the information received from the application, based on meta-data in the communication protocol, based on metadata from user's handling of the requests, based on other information, or based on some combination of the above. As a result, the dynamic security policies may be set on a per-streaming-content, per-user basis. This is in contrast to the conventional approach, which defines security rules based on protocol and IP address. The embodiments described herein allow for a finer-grained control, allowing the application of different security rules for the same protocol and IP address, e.g., at different moments based on manifest attributes and user ID but also based on CDN network availabilities, security context, and other factors.

In some embodiments, rate limiting rules may be configured in the WAF-CDN 306 by considering the profile bitrates and the media or chunk durations extracted from the manifest files. For example, chunks with a higher bitrate (thus, higher sizes) could be allowed to be requested less frequently (e.g., N chunks downloadable every N×D time interval, where D is the average length of chunks calculated from the manifest file), whereas chunks with slower bitrate (smaller in size) could be allowed to be downloaded more frequently (N chunks every 0.5N×D); this type of rule could be dictated when the network or the edge-server is under a heavier load.

According to the information provided by the CDN provisioner 308, for example the bitrate, the WCO 310 configures the WAF-CDN 306. For example, based on combined effect of manifest bitrate attribute, CDN network load, and the user IP address, the WCO 310 could choose dynamically to set the WAF-CDN 306 into high or low inspection. Eventually, it may also configure other network security functions such as L3 firewalls, or an SDN that will filter or redirect the VoD queries to another appropriate WAF-CDN for additional of out of band inspections.

WAF VoD HSS Rules

The following is a list of example rules that might be applied in a CDN that uses HSS. This list is intended to be illustrative and not limiting. In one embodiment, rules may be divided into the following types:

WAF-F1a rules, which perform HSS-VoD format compliance, e.g., which reject HSS non-compliant traffic. Such rules imply the static and generic check of the request format.

WAF-F1b rules, which detect and reject incomplete HSS requests to typically avoid applications to maintain too many unused contexts. (They are also useful to counter attacks that operate by causing a web server to open—and keep open—a large number of connections, such as Slowloris attacks). Such a WAF-rule may consume a large amount of resources if applied to all traffic, and as such should be applied to a limited subflow.

WAF-F2 rules, which match the request with the states of an HSS session. Such rules are applied on a per session basis, and the WAF-CDN 306 is provisioned in real time based on the delivery of HSS manifest files. These can be seen as a real time compliance check to the manifest files.

WAF-F3 rules, which match the request with the state of an HSS session. Such rules are applied on a per session basis, and the WAF-CDN 306 is provisioned in real time based on the delivery of HSS previous packets. These rules can be seen as derived from specific HSS policies. An example could be the anti-replay of a VoD control.

In some embodiments, the WAF-CDN 306, the WCO 310, or both, may employ a WAF rule aggregation mechanism to reduce the number of rules that must be applied to each incoming fragment request, and may reorder rules for efficiency, e.g., to put rules that are most likely to match first and the rules that are least likely to match last.

In some embodiments, the CDN request redirector 210 may be enhanced with orchestration functionality.

Given the format of a streaming content manifest file and of the streaming content fragment requests, in one embodiment, the syntax of a WAF rule may follow a classical if-condition decision template. The following expression could be used as a way to express this rule via a Command Line Interface (CLI), although other means may be used:

rule-ID [resource] [matching_cond1] [matching_cond2] decision where
  resource is (part of) Manifest/Fragment Uniform Resource identifiers (URIs)/URLs templates, identifying the manifest file or media;
  matching_cond1 is a set of one or more conditions to check whether the request is well-formed (WAF-F1a rules for well-formed HSS requests and WAF-F1b rules for complete HSS requests). This is a static description of the URL. Expression is provided using regular expressions.
  matching_cond2 corresponds to mapping the HSS states (WAF-F2 types of rules). This is also expressed using regular expression combined with variables configured by the HSS manifest delivery.
  decision may be: accept, reject, reply with an HTTP code, or limit Requests Per Second (RPS) for the media. The output may also be an output code that is handled by another function in the case of service function chaining for example.
  [ ] denotes an optional parameter In one embodiment, a global orchestrator is in charge of solving the WAF rule potential conflicts, whereas the edge server local orchestrator aggregates rules and updates the rule ordering for a fast HSS requests matching. In one embodiment, one of the input parameters taken by the rule ordering algorithm is the content popularity, which is obtained from, e.g., content hit rates. The rule optimization (ordering and aggregation) algorithm may be implementation based. For example, it may depend on the manifest file delivery function (all videos might be chunked in equal chunks, and thus fragments are identified as multiples of a duration) and the HSS media segmentation to insert advertisements, etc., as well as the popularity.

WAF VoD HSS Provisioning (Configuration)

In one embodiment, configuration of the WAF-CDN 306 may be split in two parts. The first part is pseudo-static configuration, e.g., associated with WAF-F1 provisioning. The first part comprises filtering rules to reject malformed requests for streaming content fragments. For instance, requests with keywords different from the nomenclature of the streaming protocol (e.g., .ism, .ismv, etc., for HSS) and syntax (.profile template) are rejected. The second part is a dynamic configuration, e.g., associated with WAF-F2 provisioning. The second part comprises filtering rules to force HTTP traffic to match the streaming protocol session. In one embodiment, the WAF-F2 rules are frequently updated based on existing media (e.g., manifest files, fragments, well-formed URIs, etc.) with input from the global orchestrator as a result of new manifest file delivery. For example, in one embodiment, when a user-agent (e.g., an end user device) requests a manifest file (e.g., step B in FIG. 2) for a given VoD, the manifest file delivery node "re-writes" the manifest file to add an indication in the (fragment URL pattern) part of the manifest file so that subsequent fragment requests from the user contain this indication. The indication can be used as a token to match a given session or user for example, and associate the appropriate WAF-CDN rules. In one embodiment, the indication takes the form of a pseudo-random number. This indication of a correct manifest file delivery together with the associated media ID are sent to WAFs instantiated on edge servers known to cache the fragments. In one embodiment, reception of this indication and media ID triggers new WAF-F2 rules derivation.

Likewise, some WAF-F2 rules may be inactivated (removed) following manifest file updates, content updates, etc. For instance, when a VoD with the corresponding manifest file is no longer advertised by the content provider, this may trigger WAF rule updates (removal). Also, the ISP-policy may dictate removal of unmatched WAF rules after a certain time (especially if, by default, WAF is deployed in a closed policy, i.e., unmatched rule HTTP traffic being discarded by default).

Unlike prior art solutions that check only that a request contains the correct number of parameters (e.g., by checking a Cyclic Redundancy Check (CRC) or signature), the subject matter described herein enables control based on the actual values of the parameters. The parameter values may be authorized by the edge node 204 through policies relating to the authorized URL parameters, not by mere signatures. The subject matter described herein enables flexible access control policies that are not based on a combination of single value parameters. For example, range values and time windows are possible. The subject matter described herein can enforce access control based on the complete received packet, not just the URL.

Unlike prior art solutions where the WAF is over-provisioned, the subject matter described herein optimizes the validating rules in order to reduce the number of access rules to be checked in the WAF-CDN 306. Only the valid ones are stored in the WAF-CDN 306. The subject matter described herein enables an incremental approach to protect the ISP-CDN assets (e.g., edge servers, manifest delivery nodes, etc.) through the use of (1) static filtering policy (e.g., first discard incomplete streaming content fragment requests by default) and (2) dynamic filtering (e.g., discard the streaming content fragment requests for wrong fragment ID, e.g., wrong profile, wrong byte range, etc.) before applying a complementary mechanism like signature verification.

Unlike prior art solutions that are not designed for the specific issues faced by CDNs or streaming protocols such as HSS, the subject matter described herein includes a WAF-CDN 306 that can be provisioned with customized WAF rules that can limit the frequency of same fragment requests to counter HTTP flooding Distributed Denial of Service (DDoS) attacks.

The methods and systems described herein support automatic and dynamic activation of a selected WAF streaming content rule associated with detected traffic. For example, in one embodiment, a WAF streaming content rule that applies to a particular type of traffic need not be activated until traffic of that type is detected. Automatic life cycle management of these WAF streaming content rules is also made possible, as well as orchestration of security policies that require coordination between WAF streaming content rules and non WAF streaming content policies, such as IP filtering. Knowledge of the streaming content internal state allows the WAF-CDN 306 to employ more sophisticated methods to detect and mitigate suspicious or malicious traffic than can conventional systems. Other advantages include, but are not limited to:

The operator can expand its VoD business to a larger panel of devices with relaxed assumptions regarding strong "end user device certification."

Compared to generic WAFs, the WAF-CDN 306 described herein introduces less overhead on the CDN application itself (e.g., VoD streaming). This is accomplished by applying targeted protection incrementally, that is, activating only certain WAF filtering on-demand, under some edge streaming loads.

With the same objective of reducing the security solution overhead, the subject matter described herein limits WAF overprovisioning. The subject matter described herein minimizes the number of rules via rule aggregation, in addition to avoiding unnecessary filtering based on the intelligent HTTP traffic steering implemented at the edge server via a reverse proxy like mechanism.

Filtering rules that consider the streaming content state model (first manifest delivery prior to sample media requests) are powerful tools that can mitigate HTTP GET flooding DDoS attacks, which are known to be difficult to filter.

Although the concepts described herein have been presented primarily in the context of protecting a VDF 304, the same concepts may be applied to protect other nodes, such as a node that delivers manifest files (e.g., the MDF 300). Additionally, the concepts described herein can be expanded to other streaming protocols (e.g., HLS, etc.) that are known to fit a framework similar to HSS.

Figure 5:
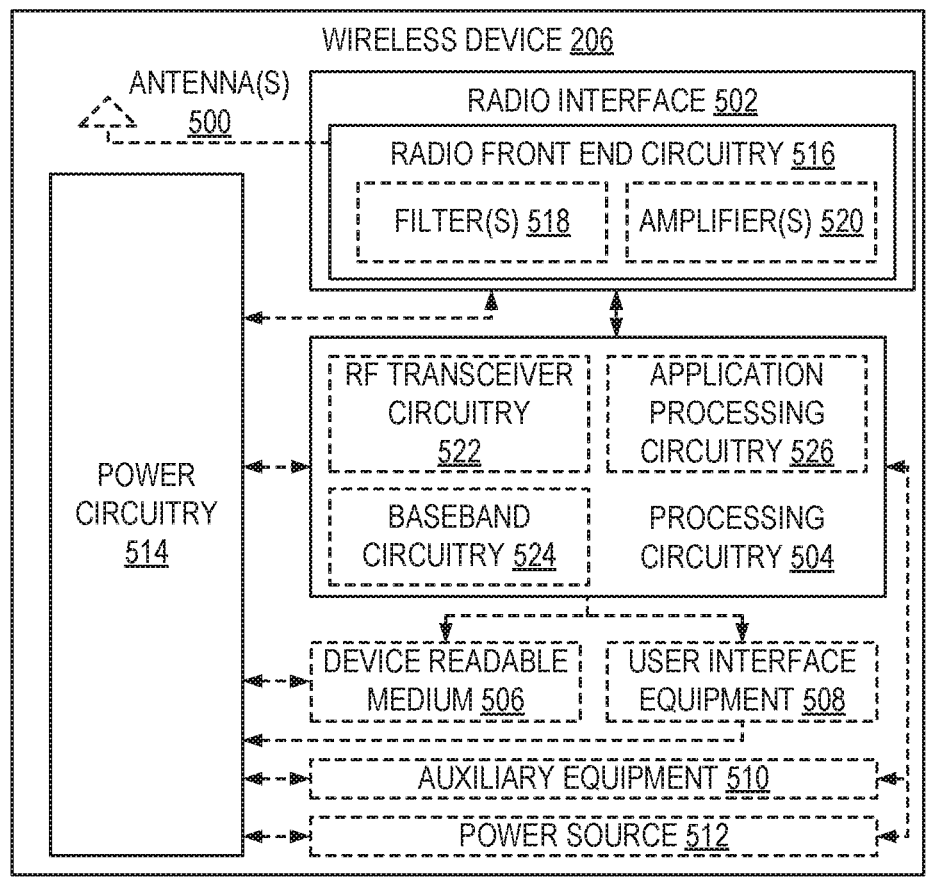
FIGS. 5 and 6 illustrate example embodiments of a wireless device.

FIG. 5 illustrates one example of a wireless device 206 in accordance with some embodiments of the present disclosure. The wireless device 206 includes various components described in more detail below. These components work together in order to provide wireless device functionality, such as providing wireless connections in a wireless network.

As illustrated, the wireless device 206 includes one or more antennas 500, a radio interface 502, processing circuitry 504, a device readable medium 506, user interface equipment 508, auxiliary equipment 510, a power source 512, and power circuitry 514. The wireless device 206 may include multiple sets of one or more of the illustrated components for different wireless technologies supported by the wireless device 206, such as, for example, Global System for Mobile Communications (GSM), Wideband Code Division Multiple Access (WCDMA), LTE, NR, WiFi, Worldwide Interoperability for Microwave Access (WiMAX), or Bluetooth wireless technologies, just to mention a few. These wireless technologies may be integrated into the same or different chips or set of chips as other components within the wireless device 206.

The antenna(s) 500 may include one or more antennas or antenna arrays configured to send and/or receive wireless signals and are connected to the radio interface 502. In certain alternative embodiments, the antenna(s) 500 may be separate from the wireless device 206 and be connectable to the wireless device 206 through an interface or port. The antenna(s) 500, the radio interface 502, and/or the processing circuitry 504 may be configured to perform any receiving or transmitting operations described herein as being performed by the wireless device 206. Any information, data, and/or signals may be received from a network node and/or another wireless device 206. In some other embodiments, the antenna(s) 500 may be part of the radio interface 502.

As illustrated, the radio interface 502 comprises radio front end circuitry 516 and, in some alternative embodiments, the antenna(s) 500. The radio front end circuitry 516 comprises one or more filters 518 and amplifiers 520. The radio front end circuitry 516 is connected to the antenna(s) 500 and the processing circuitry 504 and is configured to condition signals communicated between the antenna(s) 500 and the processing circuitry 504. The radio front end circuitry 516 may be coupled to or be a part of the antenna(s) 500. In some embodiments, the wireless device 206 may not include separate radio front end circuitry 516; rather, the processing circuitry 504 may comprise radio front end circuitry 516 and may be connected to the antenna(s) 500. Similarly, in some embodiments, some or all of Radio Frequency (RF) transceiver circuitry 522 may be considered a part of the radio interface 502. The radio front end circuitry 516 may receive digital data that is to be sent out to other network nodes or wireless devices 206 via a wireless connection. The radio front end circuitry 516 may convert the digital data into a radio signal having the appropriate channel and bandwidth parameters using a combination of the filters 518 and/or the amplifiers 520. The radio signal may then be transmitted via the antenna(s) 500. Similarly, when receiving data, the antenna(s) 500 may collect radio signals which are then converted into digital data by the radio front end circuitry 516. The digital data may be passed to the processing circuitry 504. In other embodiments, the radio interface 502 may comprise different components and/or different combinations of components.

The processing circuitry 504 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other wireless device 206 components, such as the device readable medium 506, wireless device 206 functionality. Such functionality may include providing any of the various wireless features or benefits discussed herein. For example, the processing circuitry 504 may execute instructions stored in the device readable medium 506 or in memory within the processing circuitry 504 to provide the functionality disclosed herein.

As illustrated, the processing circuitry 504 includes one or more of the RF transceiver circuitry 522, baseband processing circuitry 524, and application processing circuitry 526. In other embodiments, the processing circuitry 504 may comprise different components and/or different combinations of components. In certain embodiments, the processing circuitry 504 of the wireless device 206 may comprise a System on a Chip (SOC). In some embodiments, the RF transceiver circuitry 522, the baseband processing circuitry 524, and the application processing circuitry 526 may be on separate chips or sets of chips. In alternative embodiments, part or all of the baseband processing circuitry 524 and the application processing circuitry 526 may be combined into one chip or set of chips, and the RF transceiver circuitry 522 may be on a separate chip or set of chips. In still alternative embodiments, part or all of the RF transceiver circuitry 522 and the baseband processing circuitry 524 may be on the same chip or set of chips, and the application processing circuitry 526 may be on a separate chip or set of chips. In yet other alternative embodiments, part or all of the RF transceiver circuitry 522, the baseband processing circuitry 524, and the application processing circuitry 526 may be combined in the same chip or set of chips. In some embodiments, the RF transceiver circuitry 522 may be a part of the interface radio interface 502. The RF transceiver circuitry 522 may condition RF signals for the processing circuitry 504.

In certain embodiments, some or all of the functionality described herein as being performed by a wireless device 206 may be provided by the processing circuitry 504 executing instructions stored on the device readable medium 506, which in certain embodiments may be a computer-readable storage medium. In alternative embodiments, some or all of the functionality may be provided by the processing circuitry 504 without executing instructions stored on a separate or discrete device readable storage medium, such as in a hard-wired manner. In any of these particular embodiments, whether executing instructions stored on a device readable storage medium or not, the processing circuitry 504 can be configured to perform the described functionality. The benefits provided by such functionality are not limited to the processing circuitry 504 alone or to other components of the wireless device 206, but are enjoyed by the wireless device 206 as a whole, and/or by end users and the wireless network generally.

The processing circuitry 504 may be configured to perform any determining, calculating, or similar operations (e.g., certain obtaining operations) described herein as being performed by a wireless device 206. These operations, as performed by the processing circuitry 504, may include processing information obtained by the processing circuitry 504 by, for example, converting the obtained information into other information, comparing the obtained information or converted information to information stored by the wireless device 206, and/or performing one or more operations based on the obtained information or converted information, and as a result of said processing making a determination.

The device readable medium 506 may be operable to store a computer program; software; an application including one or more of logic, rules, code, tables, etc.; and/or other instructions capable of being executed by the processing circuitry 504. The device readable medium 506 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by the processing circuitry 504. In some embodiments, the processing circuitry 504 and the device readable medium 506 may be considered to be integrated.

The user interface equipment 508 may provide components that allow for a human user to interact with the wireless device 206. Such interaction may be of many forms, such as visual, audial, tactile, etc. The user interface equipment 508 may be operable to produce output to the user and to allow the user to provide input to the wireless device 206. The type of interaction may vary depending on the type of user interface equipment 508 installed in the wireless device 206. For example, if the wireless device 206 is a smart phone, the interaction may be via a touch screen; if the wireless device 206 is a smart meter, the interaction may be through a screen that provides usage (e.g., the number of gallons used) or a speaker that provides an audible alert (e.g., if smoke is detected). The user interface equipment 508 may include input interfaces, devices, and circuits, and output interfaces, devices, and circuits. The user interface equipment 508 is configured to allow input of information into the wireless device 206, and is connected to the processing circuitry 504 to allow the processing circuitry 504 to process the input information. The user interface equipment 508 may include, for example, a microphone, a proximity or other sensor, keys/buttons, a touch display, one or more cameras, a Universal Serial Bus (USB) port, or other input circuitry. The user interface equipment 508 is also configured to allow output of information from the wireless device 206 and to allow the processing circuitry 504 to output information from the wireless device 206. The user interface equipment 508 may include, for example, a speaker, a display, vibrating circuitry, a USB port, a headphone interface, or other output circuitry. Using one or more input and output interfaces, devices, and circuits of the user interface equipment 508, the wireless device 206 may communicate with end users and/or the wireless network and allow them to benefit from the functionality described herein.

The auxiliary equipment 510 is operable to provide more specific functionality which may not be generally performed by wireless devices. This may comprise specialized sensors for doing measurements for various purposes, interfaces for additional types of communication such as wired communications, etc. The inclusion and type of components of the auxiliary equipment 510 may vary depending on the embodiment and/or scenario.

The power source 512 may, in some embodiments, be in the form of a battery or battery pack. Other types of power sources, such as an external power source (e.g., an electricity outlet), photovoltaic devices, or power cells may also be used. The wireless device 206 may further comprise the power circuitry 514 for delivering power from the power source 512 to the various parts of the wireless device 206 which need power from the power source 512 to carry out any functionality described or indicated herein. The power circuitry 514 may in certain embodiments comprise power management circuitry. The power circuitry 514 may additionally or alternatively be operable to receive power from an external power source, in which case the wireless device 206 may be connectable to the external power source (such as an electricity outlet) via input circuitry or an interface such as an electrical power cable. The power circuitry 514 may also in certain embodiments be operable to deliver power from an external power source to the power source 512. This may be, for example, for the charging of the power source 512. The power circuitry 514 may perform any formatting, converting, or other modification to the power from the power source 512 to make the power suitable for the respective components of the wireless device 206 to which power is supplied.

Figure 6:
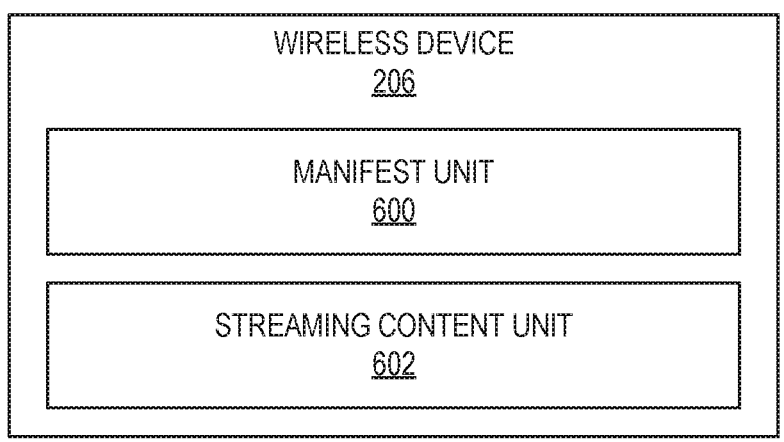

FIG. 6 illustrates the wireless device 206 in accordance with some other embodiments of the present disclosure. Here, the wireless device 206 is a "virtual apparatus." The wireless device 206 is operable to carry out the example methods described with reference to FIG. 4 and possibly any other processes or methods disclosed herein. It is also to be understood that the methods of FIG. 4 are not necessarily carried out solely by the wireless device 206. At least some operations of the method can be performed by one or more other entities.

The wireless device 206 of FIG. 6 may comprise processing circuitry, which may include one or more microprocessors or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols, as well as instructions for carrying out one or more of the techniques described herein, in several embodiments. In some implementations, the processing circuitry may be used to cause a manifest unit 600, a streaming content unit 602, and any other suitable units of the wireless device 206 to perform corresponding functions according one or more embodiments of the present disclosure.

As illustrated in FIG. 6, the wireless device 206 includes the manifest unit 600 and the streaming content unit 602. The manifest unit 600 is configured to request a manifest associated with a desired streaming content, receive the requested manifest, and process the manifest to determine the proper format for a request for the streaming content. The streaming content unit 602 is configured to issue requests for the streaming content in the proper format and to receive the requested streaming content.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein.

Figure 7:
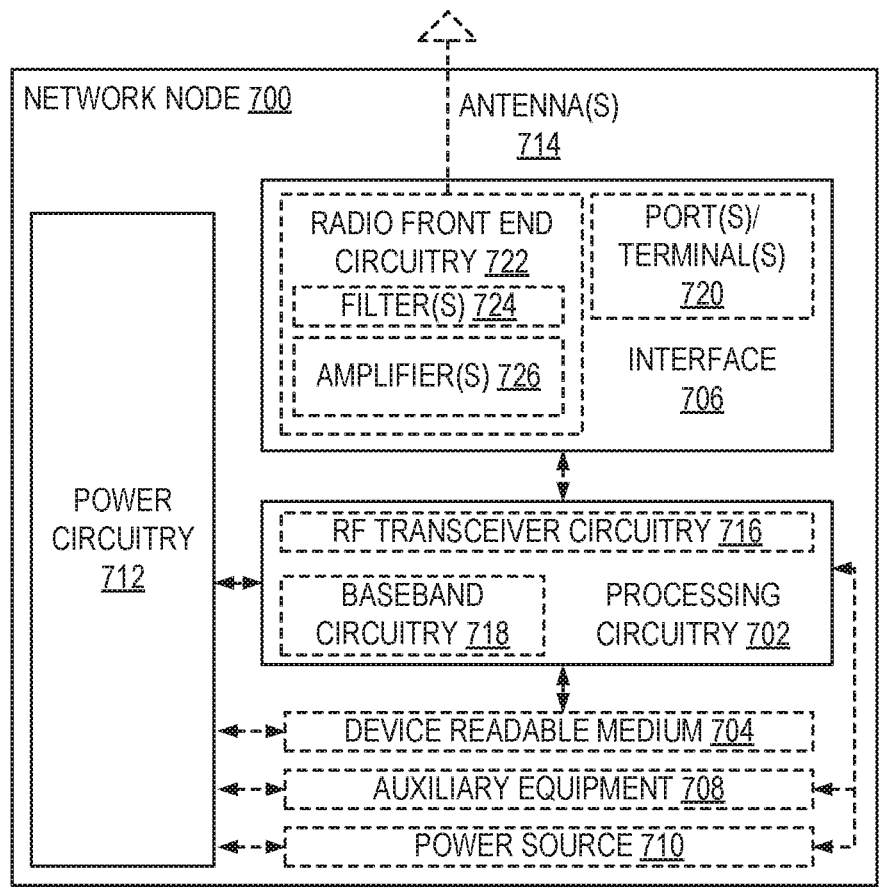
FIGS. 7 and 8 illustrate example embodiments of a network node, such as an edge node.

FIG. 7 illustrates one example of a network node 700 in accordance with some embodiments of the present disclosure. The network node 700 may be an edge deliver node 204 or any other network node such as, e.g., a core network node. The network node 700 includes various components described in more detail below. These components work together in order to provide network node functionality, such as providing wireless connections in a wireless network.

As illustrated, the network node 700 includes processing circuitry 702, a device readable medium 704, an interface 706, auxiliary equipment 708, a power source 710, power circuitry 712, and an antenna(s) 714. Although the edge delivery node 204 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 700 are depicted as single boxes located within a larger box, or nested within multiple boxes, in practice, a network node may comprise multiple different physical components that make up a single illustrated component (e.g., the device readable medium 704 may comprise multiple separate hard drives as well as multiple RAM modules).

Similarly, the network node 700 may be composed of multiple physically separate components (e.g., a Node B component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 700 may be configured to support multiple Radio Access Technologies (RATs). In such embodiments, some components may be duplicated (e.g., a separate device readable medium 704 for the different RATs) and some components may be reused (e.g., the same antenna 714 may be shared by the RATs). The network node 700 may also include multiple sets of the various illustrated components for different wireless technologies integrated into the network node 700, such as, for example, GSM, WCDMA, LTE, NR, WiFi, or Bluetooth wireless technologies. These wireless technologies may be integrated into the same or a different chip or set of chips and other components within the network node 700.

The processing circuitry 702 is configured to perform any determining, calculating, or similar operations (e.g., certain obtaining operations) described herein as being provided by a network node. These operations performed by the processing circuitry 702 may include processing information obtained by the processing circuitry 702 by, for example, converting the obtained information into other information, comparing the obtained information or converted information to information stored in the network node, and/or performing one or more operations based on the obtained information or converted information, and as a result of said processing making a determination.

The processing circuitry 702 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other network node 700 components, such as the device readable medium 704, the network node 700 functionality. For example, the processing circuitry 702 may execute instructions stored in the device readable medium 704 or in memory within the processing circuitry 702. Such functionality may include providing any of the various wireless features, functions, or benefits discussed herein. In some embodiments, the processing circuitry 702 may include a SOC.

In some embodiments, the processing circuitry 702 may include one or more of RF transceiver circuitry 716 and baseband processing circuitry 718. In some embodiments, the RF transceiver circuitry 716 and the baseband processing circuitry 718 may be on separate chips (or sets of chips), boards, or units, such as radio units and digital units. In alternative embodiments, part or all of the RF transceiver circuitry 716 and the baseband processing circuitry 718 may be on the same chip or set of chips, boards, or units.

In certain embodiments, some or all of the functionality described herein as being provided by the network node 700 or radio access node 204 may be performed by the processing circuitry 702 executing instructions stored on the device readable medium 704 or memory within the processing circuitry 702. In alternative embodiments, some or all of the functionality may be provided by the processing circuitry 702 without executing instructions stored on a separate or discrete device readable medium, such as in a hard-wired manner. In any of those embodiments, whether executing instructions stored on a device readable storage medium or not, the processing circuitry 702 can be configured to perform the described functionality. The benefits provided by such functionality are not limited to the processing circuitry 702 alone or to other components of the network node 700, but are enjoyed by the network node 700 as a whole, and/or by end users and the wireless network generally.

The device readable medium 704 may comprise any form of volatile or non-volatile computer readable memory including, without limitation, persistent storage, solid state memory, remotely mounted memory, magnetic media, optical media, RAM, ROM, mass storage media (for example, a hard disk), removable storage media (for example, a flash drive, a CD or a DVD), and/or any other volatile or non-volatile, non-transitory device readable and/or computer-executable memory devices that store information, data, and/or instructions that may be used by the processing circuitry 702. The device readable medium 704 may store any suitable instructions; data or information, including a computer program; software; an application including one or more of logic, rules, code, tables, etc.; and/or other instructions capable of being executed by the processing circuitry 702 and utilized by the network node 700. The device readable medium 704 may be used to store any calculations made by the processing circuitry 702 and/or any data received via the interface 706. In some embodiments, the processing circuitry 702 and the device readable medium 704 may be considered to be integrated.

The interface 706 is used in the wired or wireless communication of signaling and/or data between the network node 700, another network, and/or the wireless devices 206. As illustrated, the interface 706 comprises port(s)/terminal(s) 720 to send and receive data, for example to and from a core network over a wired connection. The interface 706 also includes radio front end circuitry 722 that may be coupled to, or, in certain embodiments, a part of, the antenna(s) 714. The radio front end circuitry 722 comprises filters 724 and amplifiers 726. The radio front end circuitry 722 may be connected to the antenna(s) 714 and the processing circuitry 702. The radio front end circuitry 722 may be configured to condition signals communicated between the antenna(s) 714 and the processing circuitry 702. The radio front end circuitry 722 may receive digital data that is to be sent out to other network nodes or wireless devices via a wireless connection. The radio front end circuitry 722 may convert the digital data into a radio signal having the appropriate channel and bandwidth parameters using a combination of the filters 724 and/or the amplifiers 726. The radio signal may then be transmitted via the antenna(s) 714. Similarly, when receiving data, the antenna(s) 714 may collect radio signals which are then converted into digital data by the radio front end circuitry 722. The digital data may be passed to the processing circuitry 702. In other embodiments, the interface 706 may comprise different components and/or different combinations of components.

In certain alternative embodiments, the network node 700 may not include separate radio front end circuitry 722; instead, the processing circuitry 702 may comprise radio front end circuitry and may be connected to the antenna(s) 714 without separate radio front end circuitry 722. Similarly, in some embodiments, all or some of the RF transceiver circuitry 716 may be considered a part of the interface 706. In still other embodiments, the interface 706 may include the one or more ports or terminals 720, the radio front end circuitry 722, and the RF transceiver circuitry 716 as part of a radio unit (not shown), and the interface 706 may communicate with the baseband processing circuitry 718, which is part of a digital unit (not shown).

The antenna(s) 714 may include one or more antennas, or antenna arrays, configured to send and/or receive wireless signals. The antenna(s) 714 may be coupled to the radio front end circuitry 722 and may be any type of antenna capable of transmitting and receiving data and/or signals wirelessly. In some embodiments, the antenna(s) 714 may comprise one or more omni-directional, sector, or panel antennas operable to transmit/receive radio signals between, for example, 2 Gigahertz (GHz) and 66 GHz. An omni-directional antenna may be used to transmit/receive radio signals in any direction, a sector antenna may be used to transmit/receive radio signals from devices within a particular area, and a panel antenna may be a Line-of-Sight (LoS) antenna used to transmit/receive radio signals in a relatively straight line. In some instances, the use of more than one antenna may be referred to as Multiple Input Multiple Output (MIMO). In certain embodiments, the antenna(s) 714 may be separate from the network node 700 and may be connectable to the network node 700 through an interface or port 720.

The antenna(s) 714, the interface 706, and/or the processing circuitry 702 may be configured to perform any receiving operations and/or certain obtaining operations described herein as being performed by a network node. Any information, data, and/or signals may be received from a wireless device, another network node, and/or any other network equipment. Similarly, the antenna(s) 714, the interface 706, and/or the processing circuitry 702 may be configured to perform any transmitting operations described herein as being performed by a network node. Any information, data, and/or signals may be transmitted to a wireless device, another network node, and/or any other network equipment.

The power circuitry 712 may comprise, or be coupled to, power management circuitry and is configured to supply the components of the network node 700 with power for performing the functionality described herein. The power circuitry 712 may receive power from the power source 710. The power source 710 and/or the power circuitry 712 may be configured to provide power to the various components of the network node 700 in a form suitable for the respective components (e.g., at a voltage and current level needed for each respective component). The power source 710 may either be included in, or be external to, the power circuitry 712 and/or the network node 700. For example, the network node 700 may be connectable to an external power source (e.g., an electricity outlet) via input circuitry or an interface such as an electrical cable, whereby the external power source supplies power to the power circuitry 712. As a further example, the power source 710 may comprise a source of power in the form of a battery or battery pack which is connected to, or integrated in, the power circuitry 712. The battery may provide backup power should the external power source fail. Other types of power sources, such as photovoltaic devices, may also be used.

Alternative embodiments of the network node 700 may include additional components beyond those shown in FIG. 7 that may be responsible for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
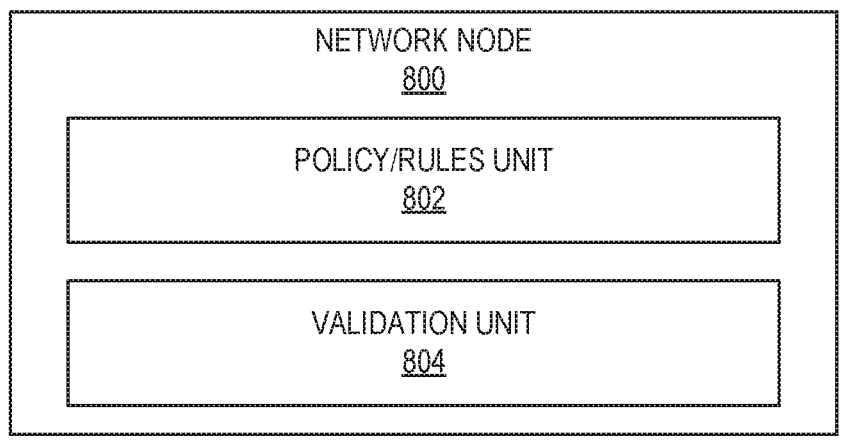

FIG. 8 illustrates a network node 800 in accordance with some other embodiments of the present disclosure. Here, the network node 800 is a "virtual apparatus." The network node 800 is operable to carry out the example methods described with reference to FIG. 4 and possibly any other processes or methods disclosed herein. It is also to be understood that the methods of FIG. 4 are not necessarily carried out solely by the network node 800. At least some operations of the method can be performed by one or more other entities.

The network node 800 may comprise processing circuitry, which may include one or more microprocessors or microcontrollers, as well as other digital hardware, which may include DSPs, special-purpose digital logic, and the like. The processing circuitry may be configured to execute program code stored in memory, which may include one or several types of memory, such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a policy/rules unit 802, a validation unit 804, and any other suitable units of the network node 800 to perform corresponding functions according one or more embodiments of the present disclosure.

As illustrated in FIG. 8, the network node 800 includes the policy/rules unit 802 and the validation unit 804. The policy/rules unit 802 is configured to receive at least one policy rule for validating requests for streaming content, and update a stored set of policy rules to include the received at least one policy rule. The validating unit 804 is configured to receive a request for streaming content, the request directed towards a network entity for providing the streaming content in response to requests for the streaming content, and validate the request for streaming content using the stored set of policy rules and state information associated with the streaming content. If the request is validated, the network node 800 forwards the request to the network entity for providing the streaming content; otherwise, the network node 800 may discard the invalid request and/or notify the requesting party that the request was rejected.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 9:
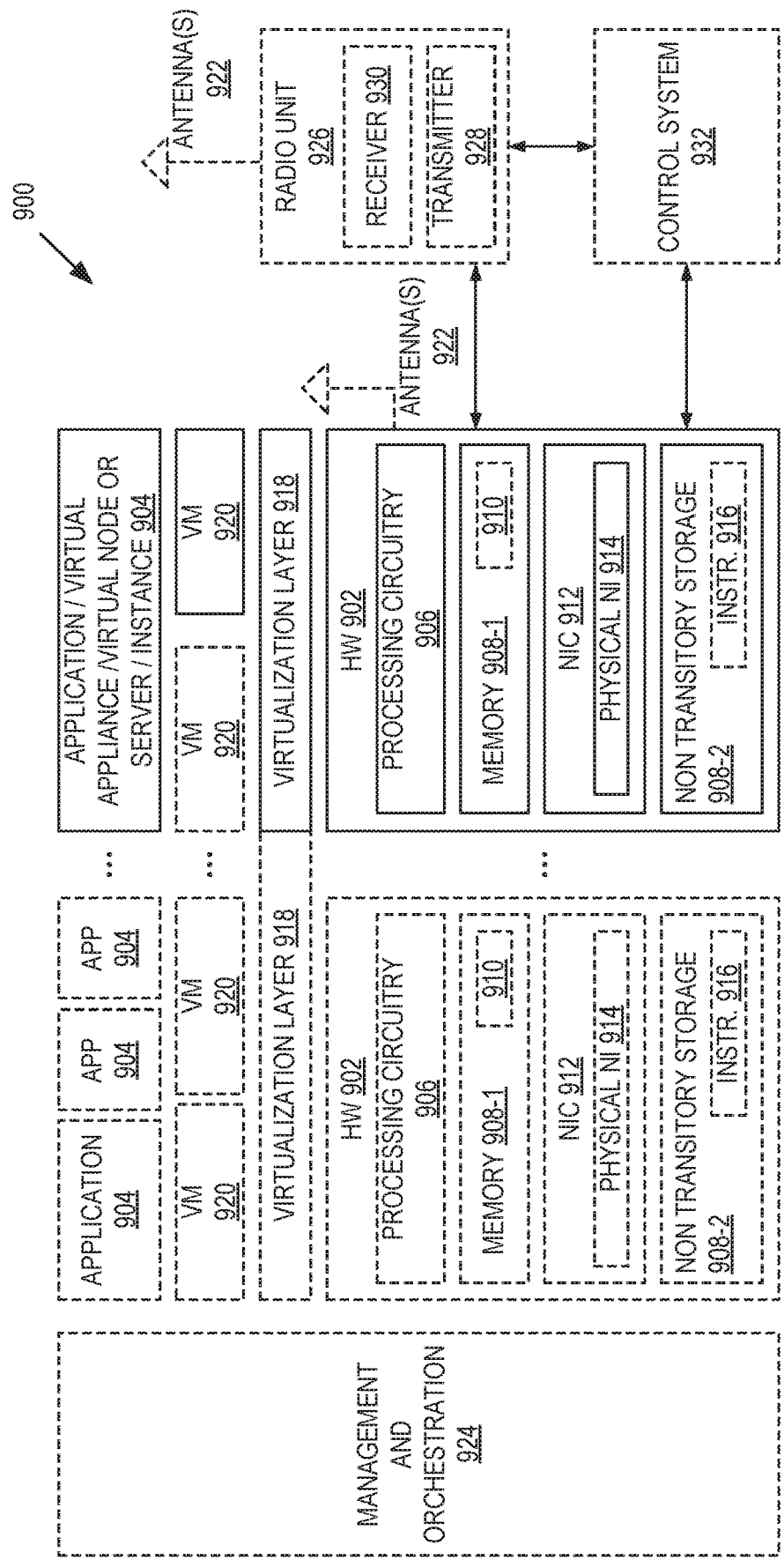
FIG. 9 is a schematic block diagram illustrating a virtualization environment in which functions implemented by some embodiments may be virtualized.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 902. Further, in embodiments in which the virtual node is not a radio access node or does not require radio connectivity (e.g., a core network node), then the network node may be entirely virtualized.

The functions may be implemented by one or more applications 904 (which may alternatively be called software instances, virtual appliances, network functions, virtual nodes, virtual network functions, etc.) operative to implement some of the features, functions, and/or benefits of some of the embodiments disclosed herein. The applications 904 are run in the virtualization environment 900 which provides the hardware device 902 comprising processing circuitry 906 and memory 908. The memory 908 contains instructions 910 executable by the processing circuitry 906 whereby the application 904 is operative to provide one or more of the features, benefits, and/or functions disclosed herein.

The virtualization environment 900 comprises general-purpose or special-purpose network hardware devices 902 comprising a set of one or more processors or processing circuitry 906, which may be Commercial Off-the-Shelf (COTS) processors, dedicated ASICs, or any other type of processing circuitry, including digital or analog hardware components or special purpose processors. Each hardware device 902 may comprise memory 908-1 which may be non-persistent memory for temporarily storing instructions 910 or software executed by the processing circuitry 906. Each hardware device 902 may comprise one or more Network Interface Controllers (NICs) 912, also known as network interface cards, which include a physical network interface 914. Each hardware device 902 may also include non-transitory, persistent, machine-readable storage media 908-2 having stored therein software 916 and/or instructions executable by the processing circuitry 906. The software 916 may include any type of software including software for instantiating one or more virtualization layers 918 (also referred to as hypervisors), software to execute virtual machines 920, as well as software allowing it to execute functions, features, and/or benefits described in relation with some embodiments described herein.

The applications 904 comprise virtual processing, virtual memory, virtual networking or interface, and virtual storage, and may be run by a corresponding virtualization layer 918 or hypervisor. Different embodiments of the instance of virtual appliance 904 may be implemented on one or more of the virtual machines 920, and the implementations may be made in different ways.

During operation, the processing circuitry 906 executes the software 916 to instantiate the hypervisor or virtualization layer 918, which may sometimes be referred to as a Virtual Machine Monitor (VMM). The virtualization layer 918 may present a virtual operating platform that appears like networking hardware to the virtual machine 920.

As shown in FIG. 9, the hardware device 902 may be a standalone network node with generic or specific components. The hardware device 902 may comprise an antenna 922 and may implement some functions via virtualization. Alternatively, the hardware device 902 may be part of a larger cluster of hardware (e.g., such as in a data center or in Customer Premises Equipment (CPE)) where many hardware nodes work together and are managed via a Management and Orchestration (MANO) 924, which, among others, oversees lifecycle management of the applications 904.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 920 may be a software implementation of a physical machine that runs programs as if they were executing on a physical, non-virtualized machine. Each of the virtual machines 920, and that part of the hardware device 902 that executes that virtual machine 920, be it hardware dedicated to that virtual machine 920 and/or hardware shared by that virtual machine 920 with others of the virtual machines 920, forms a separate Virtual Network Element (VNE).

Still in the context of NFV, Virtual Network Function (VNF) is responsible for handling specific network functions that run in one or more virtual machines 920 on top of the hardware device 902 and corresponds to the application 904 in FIG. 9.

In some embodiments, one or more radio units 926 that each include one or more transmitters 928 and one or more receivers 930 may be coupled to the one or more antennas 922. The radio units 926 may communicate directly with the hardware devices 902 via one or more appropriate network interfaces and may be used in combination with the virtual components to provide a virtual node with radio capabilities, such as a radio access node or a base station.

In some embodiments, some signaling can be effected with the use of a control system 932, which may alternatively be used for communication between the hardware devices 902 and the radio unit 926.

Figure 10:
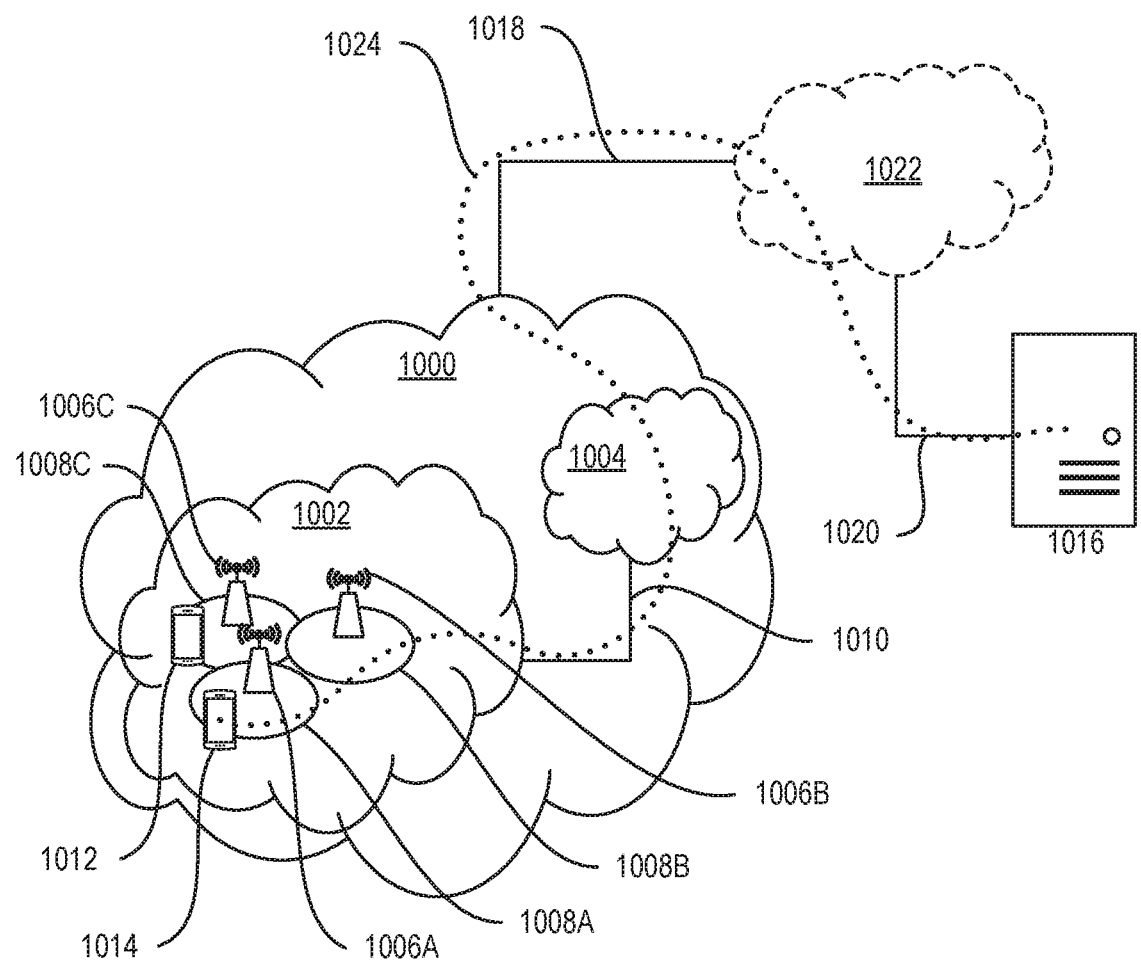
FIG. 10 illustrates a telecommunication network connected via an intermediate network to a host computer in accordance with some embodiments of the present disclosure.

FIG. 10 illustrates a communication system in accordance with an embodiment that includes a telecommunication network 1000, such as a 3GPP-type cellular network, which comprises an access network 1002, such as a Radio Access Network (RAN), and a core network 1004. The access network 1002 comprises a plurality of base stations 1006A, 1006B, 1006C, such as Node Bs, eNBs, gNBs, or other types of wireless APs, each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area 1008 or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016. Example implementations, in accordance with an embodiment, of the UE, base station, and host computer discussed in the preceding paragraphs will now be described with reference to FIG. 11.

Figure 11:
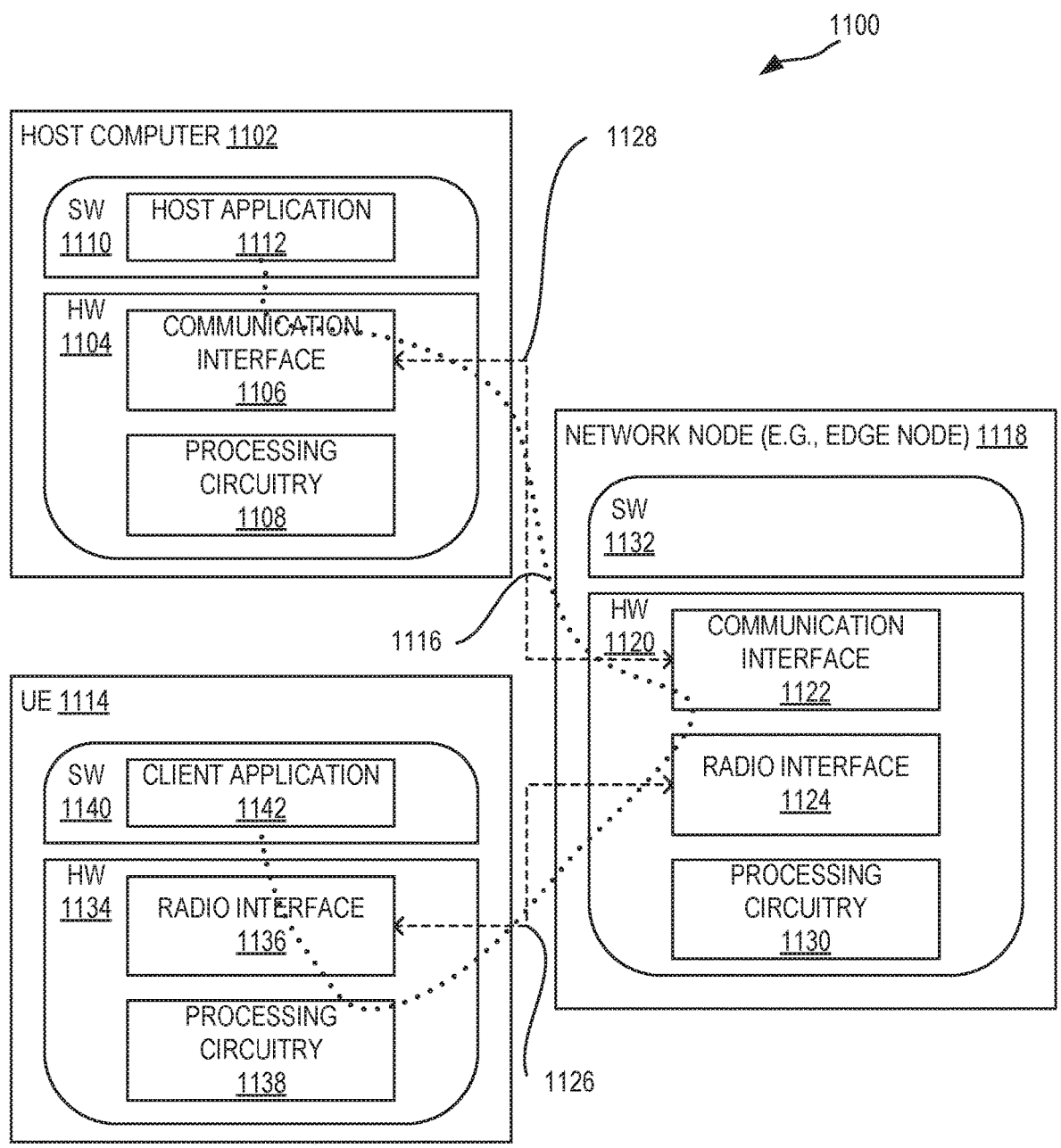
FIG. 11 is a generalized block diagram of a host computer communicating via a network node with a UE over a partially wireless connection in accordance with some embodiments of the present disclosure.

FIG. 11 illustrates a communication system 1100 in accordance with some embodiments of the present disclosure. A host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a network node 1118 provided in a telecommunication system and comprising hardware 1120 enabling it to communicate with the host computer 1102 and with the UE 1114. In one embodiment, the network node 1118 comprises an edge delivery node 204. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the network node 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the network node 1118 further includes processing circuitry 1130, which may comprise one or more programmable processors, ASICs, FPGAs, or combinations of these (not shown) adapted to execute instructions. The network node 1118 further has software 1132 stored internally or accessible via an external connection.

The communication system 1100 further includes the UE 1114 already referred to. The UE's 1114 hardware 1134 may include a radio interface 1136 configured to set up and maintain the wireless connection 1126 with the network node 1118 serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

It is noted that the host computer 1102, the network node 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the network node 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further make decisions by which it dynamically changes the routing (e.g., on the basis of load balancing consideration or reconfiguration of the network).

The wireless connection 1126 between the UE 1114 and the network node 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may improve the performance of a CDN by rejecting malformed requests for streaming content and also by using knowledge about the state of the streaming content along with rules to identify and mitigate malicious behaviors.

A measurement procedure may be provided for the purpose of monitoring data rate, latency, and other factors on which the one or more embodiments improve. There may further be optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the network node 1118, and it may be unknown or imperceptible to the network node 1118. Such procedures and functionalities may be known and practiced in the art. In certain embodiments, measurements may involve proprietary UE signaling facilitating the host computer's 1102 measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

FIG. 12 is a flowchart illustrating a method implemented in a communication system, in accordance with one embodiment. The communication system includes a host computer, a network node, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the network node transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

FIG. 13 is a flowchart illustrating a method implemented in a communication system, in accordance with one embodiment. The communication system includes a host computer, a network node, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown), the host computer provides the user data by executing a host application. In step 1302, the host computer initiates a transmission carrying the user data to the UE. The transmission may pass via the network node, in accordance with the teachings of the embodiments described throughout this disclosure. In step 1304 (which may be optional), the UE receives the user data carried in the transmission.

FIG. 14 is a flowchart illustrating a method implemented in a communication system, in accordance with one embodiment. The communication system includes a host computer, a network node, and a UE which may be those described with reference to FIGS. 10 and 11. For simplicity of the present disclosure, only drawing references to FIG. 14 will be included in this section. In step 1400 (which may be optional), the UE receives input data provided by the host computer. Additionally or alternatively, in step 1402, the UE provides user data. In sub-step 1404 (which may be optional) of step 1400, the UE provides the user data by executing a client application. In sub-step 1406 (which may be optional) of step 1402, the UE executes a client application which provides the user data in reaction to the received input data provided by the host computer. In providing the user data, the executed client application may further consider user input received from the user. Regardless of the specific manner in which the user data was provided, the UE initiates, in sub-step 1408 (which may be optional), transmission of the user data to the host computer. In step 1410, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a network node, and a UE which may be those described with reference to FIGS. 10 and 11. For simplicity of the present disclosure, only drawing references to FIG. 15 will be included in this section. In step 1500 (which may be optional), in accordance with the teachings of the embodiments described throughout this disclosure, the network node receives user data from the UE. In step 1502 (which may be optional), the network node initiates transmission of the received user data to the host computer. In step 1504 (which may be optional), the host computer receives the user data carried in the transmission initiated by the network node.

Figure 16:
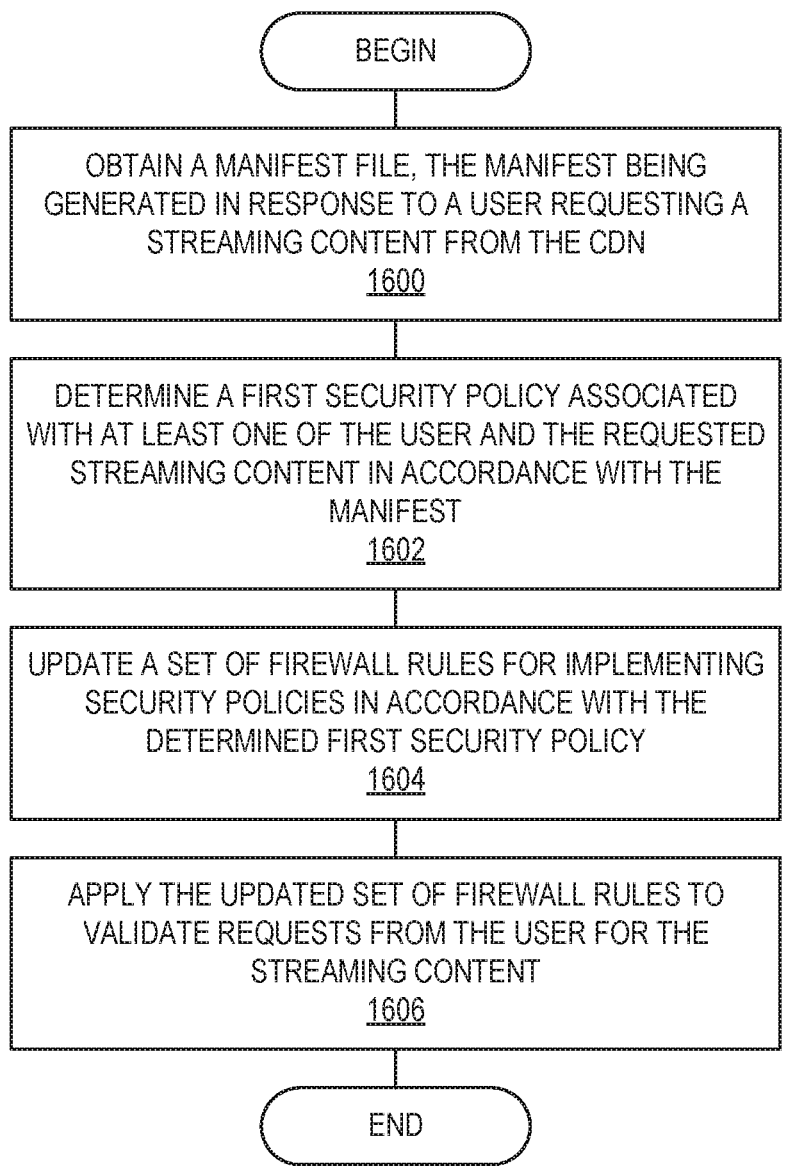
FIG. 16 is a flowchart illustrating an exemplary method for automatic provisioning of security policies for content streaming control by a network node within a CDN that supports at least one streaming media protocol, in accordance with some embodiments of the present disclosure.

FIG. 16 is a flowchart illustrating an exemplary method for automatic provisioning of security policies for content streaming control by a network node within a CDN that supports at least one streaming media protocol, in accordance with one embodiment. In the embodiment illustrated in FIG. 16, the method includes obtaining a manifest, the manifest being generated in response to a user requesting a streaming content from the CDN (step 1600); determining a first security policy associated with at least one of the user and the requested streaming content in accordance with the manifest (step 1602); updating a set of firewall rules for implementing security policies in accordance with the determined first security policy (step 1604); and applying the updated set of firewall rules to validate requests from the user for the streaming content (step 1606).

As has been stated above, policies may be put into effect upon detection of a particular condition or event, before, during or after content is being streamed. This means that the security policies, and the firewall rules to implement them, may be dynamically updated in response to receiving request fragments, e.g., when a user issues an unexpectedly or unreasonably high number of requests within a short amount of time, when a user issues an unexpectedly or unreasonably high number of requests for the same fragment, when a user issues requests for fragments in an unexpected order, and the like. Policies may be dynamically implemented based on state information associated with streaming content, where state information may be determined based on the contents of a fragment request and/or based on metadata or other data not included within a fragment request, such as number of times a request has been repeated, etc. Thus, in addition to application of existing policies (e.g., to mitigate network flooding by malicious requests), reception of fragment requests may cause additional policies to be put into place, such as to curtail any further activity by the user who is suspected of malicious activity, for example.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The methods presented herein provide a strong access control of the end users' interaction with a CDN infrastructure. The subject matter presented herein includes enforcing fine grained access control policies based on the user's identity as well as streaming parameters that need to be enforced by the server in charge of streaming the video—also designated as the edge server. Such policies can include access to a given content, as well as narrowing the possibilities of replaying a video by the end user or preventing the user of specific streaming behaviors.

Such policies are client based and cannot be provisioned statically into the edge server. The subject matter presented herein includes specific rules enforced at the streaming layer by a WAF optimized for the streaming content protocol, such as HSS, DASH, etc. The major advantage of enforcing rules by a WAF instead of traditional URL signature is that URL signature only makes possible to validate that all parameters have specific values and parameters can only take a single value. The signature determines whether or not parameters take the appropriate value, but parameters are not checked independently. Using WAF rules provides more flexibility as it makes possible to check particular parameters, and provides multiple values for these parameters.

The subject matter presented herein includes streaming policies that can be based on pattern matching of specific streaming parameters present in the URL. On the other hand, rules may also have specific logic and counters—for example limiting the number of replays is enforced by counting the number of times a user requests streaming of a chunk.

The subject matter presented herein includes a method to dynamically provision the control access module (WAF) with legitimate rules to apply. This method enables an automatic provisioning and management of these rules according to policies, and limits the number of rules that are not matched.

EXAMPLE EMBODIMENTS

While not being limited thereto, some additional example embodiments of the present disclosure are provided below.

Embodiment 1

A communication system including a host computer comprises: processing circuitry configured to provide user data; and a communication interface configured to forward the user data to a cellular network for transmission to a UE, wherein the cellular network comprises a network node having a radio interface and processing circuitry. The processing circuitry is configured to: determine or receive first information identifying a user and identifying a streaming content requested by the user; determine at least one policy for video streaming control based on the received information; and apply the determined at least one policy to validate requests from the user for the streaming content.

Embodiment 2

The communication system of embodiment 1, further including the network node.

Embodiment 3

The communication system of embodiment 2, further including the UE, wherein the UE is configured to communicate with the network node.

Embodiment 4

The communication system of embodiment 1, wherein: the processing circuitry of the host computer is configured to execute a host application, thereby providing the user data; and the UE comprises processing circuitry configured to execute a client application associated with the host application.

Embodiment 5

A method implemented in a network node, comprising: determining or receiving first information identifying a user and identifying a streaming content requested by the user; determining at least one policy for video streaming control based on the first information; and applying the determined at least one policy to validate requests from the user for the streaming content.

Embodiment 6

A method implemented in a communication system including a host computer, a network node and a User Equipment, UE, the method comprising: at the host computer, providing user data; and at the host computer, initiating a transmission carrying the user data to the UE via a cellular network comprising the network node, wherein the network node determines or receives first information identifying a user and identifying a streaming content requested by the user, determines at least one policy for video streaming control based on the received information, and applies the determined at least one policy to validate requests from the user for the streaming content.

Embodiment 7

The method of embodiment 6, further comprising: at the network node, transmitting the user data.

Embodiment 8

The method of embodiment 7, wherein the user data is provided at the host computer by executing a host application, the method further comprising: at the UE, executing a client application associated with the host application.

Embodiment 9

A User Equipment, UE, configured to communicate with a network node, the UE comprising a radio interface and processing circuitry configured to: send a manifest request for requesting a manifest for streaming content; receive a manifest response comprising the manifest for the streaming content, the manifest identifying the format of a request of the streaming content; and send, to the network node, a request for streaming content, the request complying with the format identified in the manifest.

Embodiment 10

A communication system including a host computer comprising: processing circuitry configured to provide user data; and a communication interface configured to forward user data to a cellular network for transmission to a User Equipment, UE, wherein the UE comprises a radio interface and processing circuitry, the UE's processing circuitry configured to: send a manifest request for requesting a manifest for streaming content; receive a manifest response comprising the manifest for the streaming content, the manifest identifying the format of a request of the streaming content; and send, to a network node, a request for streaming content, the request complying with the format identified in the manifest.

Embodiment 11

The communication system of embodiment 10, further including the UE.

Embodiment 12

The communication system of embodiment 11, wherein the cellular network further includes a network node configured to communicate with the UE.

Embodiment 13

The communication system of embodiment 11 or 12, wherein: the processing circuitry of the host computer is configured to execute a host application, thereby providing the user data; and the UE's processing circuitry is configured to execute a client application associated with the host application.

Embodiment 14

A method implemented in a User Equipment, UE, comprising: sending a manifest request for requesting a manifest for streaming content; receiving a manifest response comprising the manifest for the streaming content, the manifest identifying the format of a request of the streaming content; and sending, to a network node, a request for streaming content, the request complying with the format identified in the manifest.

Embodiment 15

A method implemented in a communication system including a host computer, a network node and a User Equipment, UE, the method comprising: at the host computer, providing user data; and at the host computer, initiating a transmission carrying the user data to the UE via a cellular network comprising the network node, wherein the UE: sends a manifest request for requesting a manifest for streaming content; receives a manifest response comprising the manifest for the streaming content, the manifest identifying the format of a request of the streaming content; and sends, to the network node, a request for streaming content, the request complying with the format identified in the manifest.

Embodiment 16

The method of embodiment 15, further comprising: at the UE, receiving the requested streaming content.

Embodiment 17

A User Equipment, UE, configured to communicate with a network node, the UE comprising a radio interface and processing circuitry configured to send, to a network node, a request for streaming content.

Embodiment 18

A communication system including a host computer comprising: a communication interface configured to receive user data originating from a transmission from a User Equipment, UE, to a network node, wherein the UE comprises a radio interface and processing circuitry, the UE's processing circuitry configured to send, to a network node, a request for streaming content.

Embodiment 19

The communication system of embodiment 18, further including the UE.

Embodiment 20

The communication system of embodiment 19, further including the network node, wherein the network node comprises a radio interface configured to communicate with the UE and a communication interface configured to forward to the host computer the user data carried by a transmission from the UE to the network node.

Embodiment 21

The communication system of embodiment 19 or 20, wherein: the processing circuitry of the host computer is configured to execute a host application; and the UE's processing circuitry is configured to execute a client application associated with the host application, thereby providing the user data.

Embodiment 22

The communication system of embodiment 19 or 20, wherein: the processing circuitry of the host computer is configured to execute a host application, thereby providing request data; and the UE's processing circuitry is configured to execute a client application associated with the host application, thereby providing the user data in response to the request data.

Embodiment 23

A method implemented in a User Equipment, UE, comprising sending, to a network node, a request for streaming content.

Embodiment 24

The method of embodiment 23, further comprising: providing user data; and forwarding the user data to a host computer via the transmission to the network node.

Embodiment 25

A method implemented in a communication system including a host computer, a network node and a User Equipment, UE, the method comprising: at the host computer, receiving user data transmitted to the network node from the UE, wherein the UE sends, to the network node, a request for streaming data.

Embodiment 26

The method of embodiment 25, further comprising: at the UE, providing the user data to the network node.

Embodiment 27

The method of embodiment 26, further comprising: at the UE, executing a client application, thereby providing the user data to be transmitted; and at the host computer, executing a host application associated with the client application.

Embodiment 28

The method of embodiment 26, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 29

A network node configured to communicate with a User Equipment, UE, the network node comprising a radio interface and processing circuitry configured to: determine or receive first information identifying a user and identifying a streaming content requested by the user; determine at least one policy for video streaming control based on the received information; and apply the determined at least one policy to validate requests from the user for the streaming content.

Embodiment 30

A communication system including a host computer comprising a communication interface configured to receive user data originating from a transmission from a User Equipment, UE, to a network node, wherein the network node comprises a radio interface and processing circuitry, the processing circuitry configured to: determine or receive first information identifying a user and identifying a streaming content requested by the user; determine at least one policy for video streaming control based on the received information; and apply the determined at least one policy to validate requests from the user for the streaming content.

Embodiment 31

The communication system of embodiment 30, further including the network node.

Embodiment 32

The communication system of embodiment 31, further including the UE, wherein the UE is configured to communicate with the network node.

Embodiment 33

The communication system of embodiment 32, wherein: the processing circuitry of the host computer is configured to execute a host application; the UE is configured to execute a client application associated with the host application, thereby providing the user data to be received by the host computer.

Embodiment 34

A method implemented in a network node, the method comprising: determining or receiving first information identifying a user and identifying a streaming content requested by the user; determining at least one policy for video streaming control based on the first information; and applying the determined at least one policy to validate requests from the user for the streaming content.

Embodiment 35

A method implemented in a communication system including a host computer, a network node and a User Equipment, UE, the method comprising: at the host computer, receiving, from the network node, user data originating from a transmission which the network node has received from the UE, wherein the UE sends, to the network node, a request for streaming content.

Embodiment 36

The method of embodiment 35, further comprising: at the network node, receiving the user data from the UE.

Embodiment 37

The method of embodiment 36, further comprising: at the network node, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
CDN Content Delivery Network
CLI Command Line Interface
COTS Commercial Off-the-Shelf
CPE Customer Premise Equipment
CPU Central Processing Unit
CRC Cyclic Redundancy Check
D2D Device-to-Device
DAS Distributed Antenna System
DASH Dynamic Adaptive Streaming over Hypertext Transfer Protocol
DDoS Distributed Denial of Service
DNS Domain Name System
DRM Digital Rights Management
DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
GSM Global System for Mobile Communications
HLS Hypertext Transfer Protocol Live Streaming
HSS Hypertext Transfer Protocol Smooth Streaming
HTTP Hypertext Transfer Protocol
HTTPS Hypertext Transfer Protocol Secure
ID Identifier
IoT Internet of Things
IP Internet Protocol
ISP Internet Service Provider
LEE Laptop Embedded Equipment
LME Laptop Mounted Equipment
LoS Line of Sight
LTE Long Term Evolution
M2M Machine-to-Machine
MANO Management and Orchestration
MCE Multi-Cell/Multicast Coordination Entity
MDF Manifest Delivery Function
MDT Minimization of Drive Test(s)
MIMO Multiple Input Multiple Output
MME Mobility Management Entity
MSC Mobile Switching Center
MSR Multi-Standard Radio
MTC Machine Type Communication
NAT Network Address Translation
NB-IoT Narrowband Internet of Things
NFV Network Function Virtualization
NIC Network Interface Controller
NR New Radio
O&M Operation and Maintenance
OSS Operations Support System
OTT Over-the-Top
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RPS Requests Per Second
RR Resource Record
RRH Remote Radio Head
RRU Remote Radio Unit
SCEF Service Capability Exposure Function
SDN Software-Defined Network
SLA Service Level Agreement
SOC System on a Chip
SON Self-Organizing Network
SQL Structured Query Language
TCP Transmission Control Protocol
TLS Transport Layer Security
UE User Equipment
URI Uniform Resource Identifier
URL Uniform Resource Locator
USB Universal Serial Bus
V2I Vehicle-to-Infrastructure
V2V Vehicle-to-Vehicle
V2X Vehicle-to-Everything
VDF Video on Demand Delivery Function
VMM Virtual Machine Monitor
VNE Virtual Network Element
VNF Virtual Network Function
VoD Video on Demand
VoIP Voice over Internet Protocol
WAF Web Application Firewall
WAF-CDN Web Application Firewall for Content Delivery Network(s)
WAF-MDF Web Application Firewall for Manifest Delivery Function(s)
WCO Web Application Firewall for Content Delivery Network Orchestrator
WCDMA Wideband Code Division Multiple Access
WiMax Worldwide Interoperability for Microwave Access Those skilled in the art will recognize improvements and modifications to the embodiments of the present disclosure.

All such improvements and modifications are considered within the scope of the concepts disclosed herein.

What is claimed is:

1. A method for automatic provisioning of security policies for content streaming control by a network node comprising circuitry and within a Content Delivery Network, CDN, that supports at least one streaming media protocol, the method comprising:
   obtaining a manifest, the manifest being generated in response to a request by a user for a streaming content from the CDN;
   determining a first security policy associated with the requested streaming content in accordance with the manifest;
   updating a set of firewall rules for implementing security policies in accordance with the determined first security policy; and
   applying the updated set of firewall rules to validate requests from the user for streaming content.

2. The method of claim 1, wherein updating the set of firewall rules for implementing security policies in accordance with the determined first security policy comprises storing the updated set of firewall rules within the network node.

3. The method of claim 1, wherein obtaining the manifest comprises obtaining the manifest from a Manifest Delivery Function, MDF, that generates the manifest in response to receiving, from the user, the request for the streaming content.

4. The method of claim 1, further comprising determining or receiving information related to network conditions, wherein the determining the first security policy for content streaming control is based also on the information related to network conditions.

5. The method of claim 1, wherein updating the set of firewall rules comprises aggregating or reordering at least two rules within the set of firewall rules.

6. The method of claim 1, wherein the updated set of firewall rules comprises a rule for detecting a malformed request and for identifying the malformed request as invalid.

7. The method of claim 1, wherein the updated set of firewall rules comprises a rule for validating the request for streaming content based on state information associated with the streaming content requested by the user.

8. The method of claim 7, wherein the state information associated with the streaming content requested by the user comprises at least one of:
   information contained within the request for streaming content; and
   information associated with the request for streaming content but not contained within the request for streaming content.

9. The method of claim 7, wherein the rule for validating the request for streaming content based on state information associated with the streaming content requested by the user comprises a rule for identifying the request as invalid based on a number of times that the request has been repeated.

10. The method of claim 7, wherein the rule for validating the request for streaming content based on state information associated with the streaming content requested by the user comprises a rule for identifying the request as invalid based on an order in which the request has been issued relative to other requests.

11. The method of claim 1, further comprising, upon validation of the request for streaming content, forwarding the request to a network entity for receiving requests for streaming content.

12. The method of claim 1, further comprising, upon failure to validate the request for streaming content, not forwarding the request to a network entity for receiving requests for streaming content.

13. The method of claim 11, wherein the network entity for receiving requests for streaming content comprises a Video on Demand, VoD, Delivery Function, VDF.

14. The method of claim 1, wherein the network node within the CDN comprises an edge delivery node.

15. The method of claim 1, wherein the CDN supports at least one of:
   the Hypertext Transfer Protocol, HTTP, Smooth Streaming, HSS, protocol; the Dynamic Adaptive Streaming over HTTP, DASH, protocol; and the HTTP Live Streaming, HLS, protocol.

16. A network node for automatic provisioning of security policies for content streaming control within a Content Delivery Network, CDN, that supports at least one streaming media protocol, the network node comprising a network interface and processing circuitry configured to:
   obtain a manifest, the manifest being generated in response to a request by a user for a streaming content from the CDN;
   determine a first security policy associated with the requested streaming content in accordance with the manifest;
   update a set of firewall rules for implementing security policies in accordance with the determined first security policy; and
   apply the updated set of firewall rules to validate requests from the user for streaming content.

17. The network node of claim 16, wherein updating the set of firewall rules for implementing security policies in accordance with the determined first security policy comprises storing the updated set of firewall rules within the network node.

18. The network node of claim 16, wherein obtaining the manifest comprises obtaining a manifest from a Manifest Delivery Function, MDF, network node that generates the manifest in response to receiving, from the user, the request for the streaming content, wherein the MDF network node is comprised in the CDN.

19. The network node of claim 16, is further configured to determine or receive information related to network conditions, wherein the network node is configured to determine the first security policy for content streaming control based also on the information related to network conditions.

20. The network node of claim 16, wherein updating the set of firewall rules comprises aggregating or reordering at least two rules within the set of firewall rules.

21. The network node of claim 16, wherein the updated set of firewall rules comprises a rule for detecting a malformed request and for identifying the malformed request as invalid.

22. The network node of claim 16, wherein the updated set of firewall rules comprises a rule for validating the request based on state information associated with the streaming content requested by the user.

23. The network node of claim 22, wherein the state information associated with the streaming content requested by the user comprises at least one of:
   information contained within the request for streaming content; and
   information associated with the request for streaming content but not contained within the request for streaming content.

24. The network node of claim 22, wherein the rule for validating the request based on state information associated with the streaming content comprises a rule for identifying the request as invalid based on a number of times that the request has been repeated.

25. The network node of claim 22, wherein the rule for validating the request based on state information associated with the streaming content comprises a rule for identifying the request as invalid based on an order in which the request has been issued relative to other requests.

26. The network node of claim 16, further configured to, upon validation of the request for streaming content, forward the request to a network entity for receiving requests for streaming content.

27. The network node of claim 16, further configured to, upon failure to validate the request for streaming content, not forward the request to a network entity for receiving requests for streaming content.

28. The network node of claim 26, wherein the network entity for receiving requests for streaming content comprises a Video on Demand, VoD, Delivery Function, VDF.

29. The network node of claim 16, wherein the network node within the CDN comprises an edge delivery node.

30. The network node of claim 16, wherein the network node comprises:
- a CDN provisioner network node for obtaining the manifest, identifying the user, and identifying the streaming content requested by the user;
- a Web Application Firewall for Content Delivery Networks Orchestrator, WCO, for determining the first security policy for content streaming control based on the identified user and requested streaming content; and
- a Web Application Firewall for Content Delivery Networks, WAF-CDN, for applying the updated set of firewall rules to validate requests for streaming content, wherein the CDN provisioner network node is comprised in the CDN.

31. The network node of claim 30, wherein the CDN provisioner network node obtains the manifest by receiving or intercepting the manifest file for the streaming content requested by the user.

32. The network node of claim 16, further comprising a Manifest Delivery Function, MDF, network node for receiving from the user a request for a streaming content manifest and providing to the user the manifest file for the streaming content requested by the user, wherein the MDF network node is comprised in the CDN.

33. The network node of claim 16, further comprising a Web Application Firewall for Manifest Delivery Functions, WAF-MDF, for validating requests for streaming content manifests and forwarding valid requests for streaming content manifests to the MDF.

34. The network node of claim 30, further comprising a Video on Demand, VoD, Delivery Function, VDF, network node for providing streaming content in response to receiving validated requests for streaming content from the WAF-CDN, wherein the VDF network node is comprised in the CDN.

35. The network node of claim 16, further comprising a rules database for storing and maintaining the security policies for content streaming control.

36. The network node of claim 16, wherein the CDN supports at least one of: the Hypertext Transfer Protocol, HTTP, Smooth Streaming, HSS, protocol; the Dynamic Adaptive Streaming over HTTP, DASH, protocol; and the HTTP Live Streaming, HLS, protocol.

37. The method of claim 1, wherein the first security policy is further associated with the user.

38. The network node of claim 16, wherein the first security policy is further associated with the user.

* * * * *